| United States Patent [19] | [11] Patent Number: 4,925,603 |
|---|---|
| Nambu | [45] Date of Patent: * May 15, 1990 |

[54] PROCESS FOR THE PREPARATION OF GEL FOR USE AS COOLING MEDIUM

[75] Inventor: Masao Nambu, Kanagawa, Japan

[73] Assignee: Nippon Oil Co., Ltd., Tokyo, Japan

[*] Notice: The portion of the term of this patent subsequent to Sep. 18, 2001 has been disclaimed.

[21] Appl. No.: 88,473

[22] Filed: Aug. 19, 1987

Related U.S. Application Data

[63] Continuation of Ser. No. 841,030, Mar. 17, 1987, abandoned, which is a continuation of Ser. No. 400,821, Jul. 22, 1982, abandoned, which is a continuation-in-part of Ser. No. 375,854, May 7, 1982, abandoned.

[30] Foreign Application Priority Data

| May 16, 1981 | [JP] | Japan | 56-73938 |
| May 26, 1981 | [JP] | Japan | 56-78606 |
| Aug. 28, 1981 | [JP] | Japan | 56-134311 |
| Sep. 17, 1981 | [JP] | Japan | 56-145519 |

[51] Int. Cl.$^5$ .............................................. B29C 35/16
[52] U.S. Cl. ..................................... 264/28; 264/101; 264/102
[58] Field of Search .......................... 264/28, 101, 102

[56] References Cited

U.S. PATENT DOCUMENTS

| 4,472,542 | 9/1984 | Nambu | 264/28 |
| 4,664,857 | 5/1987 | Nambu | 264/28 |

FOREIGN PATENT DOCUMENTS

| 47-12854 | 4/1972 | Japan . | |
| 52-1134 | 1/1977 | Japan | 264/28 |
| 52-8071 | 1/1977 | Japan | 264/28 |
| 55-71532 | 5/1980 | Japan | 264/28 |

OTHER PUBLICATIONS

Japanese Patent Pub. 11311/1980.
Japanese Patent Pub. 30358/1980.

*Primary Examiner*—James Derrington
*Attorney, Agent, or Firm*—Jordan and Hamburg

[57] ABSTRACT

A process for the preparation of a gel for use as a cooling medium is provided which comprises the steps of casting an aqueous solution or suspension containing a polyvinyl alcohol having a degree of hydrolysis of not less than 95 mol % and a viscosity average polymerization degree of not less than 1500 into a mold having desired shape and dimensions, cooling the cast aqueous solution to a temperature of not higher than — (minus) 6° C., and then dehydrating without thawing the cooled mass of the cast aqueous solution in vacuum until the percentage dehydration rate reaches not less than 5 wt %.

17 Claims, No Drawings

PROCESS FOR THE PREPARATION OF GEL FOR USE AS COOLING MEDIUM

CROSS-REFERENCE TO RELATED APPLICATION

This application is a continuation of application Ser. No. 841,030, filed Mar. 17, 1987 (now abandoned), which in turn is a continuation of application, Ser. No. 400,821, filed July 22, 1982 (now abandoned), which in turn is a continuation-in-part of application Ser. No. 375,854, filed May 7, 1982 (now abandoned).

BACKGROUND OF THE INVENTION

1. Field of the Invention

The present invention relates to a process for the preparation of a gel which is used as a cooling medium, and more particularly to a process for the preparation of a gel having superior properties over those of the known similar gel materials when used as a cooling medium.

2. Prior Art

A variety of gel compositions have hitherto been proposed to be used as cooling media and some of them are applied for practical uses. Such a gel is referred to as a cooling gel, chilling gel, coldness-keeping gel, coldness-keeping heat transfer medium, colloidal coolant, coldness-keeping means, coolant composition or Icenon (Trade Name), i.e. ice pillow. However, these known coolant gels are not satisfactory in properties or involve troublesome or difficult steps in preparation, as will be summarized in items (1) to (9) below.

(1) The easiest and well-known process for the preparation of a water-containing coolant gel is the preparation of agar gel. This process comprises the step of dissolving agar in boiling water or hot water of 80° to 94° C. to obtain a solution containing not less than 0.1 wt %, for example 1 to 10 wt % of agar and the step of allowing the solution to be cooled to the room temperature, whereby a water-containing gel (hydrogel) having a water content of about 90 to 99 wt % is easily prepared. However, when the thus prepared agar gel is used as a substituting material for ice contained in an ice pillow or an ice bag after being cooled in an ice box of a refrigerator, the agar gel is poor in elasticity and too crumbly to provide a user with a comfortable touch or feeling but gives a strange and uncomfortable feeling with additional disadvantage of collapse.

(2) Although κ-carrageenan including a structure similar to agar, such as D-galactose type structure, 3,6-anhydrogalactose type structure or a partial sulfuric ester type structure of polygalactose, forms readily a hydrogel containing about 90 to 97 wt % of water, this gel is too soft and crumbly. It has been found and emphasized that the mechanical strength of this gel may be improved by immersing the same into an aqueous solution of potassium chloride or calcium chloride by many persons. However, the product obtained by such an after-treatment is too crumbly for practical use, as well as the agar gel.

It is also well-known in the art to combine the carrageenan with a Locust Bean Gum. However, not much effect can be expected by this combination.

(3) It has also been well-known that another type hydrogel having a water content of 97 to 98 wt % can be obtained from an aqueous solution of a sodium salt of alginic acid including a D-manuronic acid type structure or an L-gluronic acid type structure by dropwisely adding to or immersing in an aqueous solution of a water-soluble salt of calcium, barium, zinc, copper, iron, aluminium or nickel or another acidic solution having a pH value of 2.5 to 5. However, such a hydrogel is, as is wellknown, easily to be broken and crumbly with additional disadvantage of displeasing odor.

(4) The known gelatine gel merely exhibits a soft jelly-like appearance at a concentration of gelatine of 2 to 15 wt %. However, although a gel obtainable by using a solution containing more than 15 wt %, particularly more than 30 wt %, of gelatine forms a strong mass, this gel is rigid and lacks elasticity with additional disadvantages that the water-content thereof is low and that it generates glue-like odor.

(5) KONNYAKU (devil's tongue) including a D-mannose structure and a D-glucose structure is the most advantageous amongst a number of natural gels, including gelatine, bean-curd, starch paste, agar, alginic acid, curdlan, carrageenan, furcellaran and pectin, in that it resists deformation and has sufficient elasticity and resiliency and in that a gel having very high water content of up to 97 wt % may be prepared therefrom. However, a gel prepared therefrom tends to be disintegrated rapidly after being repeatedly used as a coolant gel. In detail, although KONNYAKU is relatively stable and excellent in heat resistant property as far as it is immersed into an aqueous alkaline solution containing calcium ions, the gel is changed to a pasty form as the separation and maldistribution of lime are accelerated during the repeated cycles of cooling (freezing) and melting.

(6) It has been proposed to use an iron salt, chromium salt, aluminium salt, lead salt, barium salt or tin salt of carboxymethyl cellulose (sodium cellulose glycolate, hereinafter referred to as CMC). However, a gel obtainable from any of these materials is a soft and weak paste-like gel having a structure which is susceptible to disintegration (In this connection, reference should be made to Japanese Patent Publication No. 11210/1970). Although the gel obtained by the reaction between borax (sodium tetraborate decahydrate) and starch or CMC has been widely known, this gel is soft and weak, as well.

(7) It has been already well-known that gelation occurs instantaneously when boric acid (or an aqueous solution of boric acid) or borax (or an aqueous solution of borax) is added to an aqueous solution of polyvinyl alcohol. However, the gel thus obtained is so soft and weak that it is readily torn to pieces only by pinching by fingers. Another disadvantage of this gel is the syneresis phenomenon, i.e. separation of contained water, during the repeated uses (See Japanese Patent Publication No. 11210/1970).

In order to avoid hardening of a gel of polyvinyl alcohol-borax system due to congeal of water content in the gel when the gel is cooled in an ice-box of a cooling box or refrigerator, it has been proposed a method in which an aqueous solution of polyvinyl alcohol is added with any of monohydric alcohols, polyhydric alcohols, glucose or sucrose followed by the addition of borax to be gelatinized. However, a gel prepared in accordance with this proposal becomes weaker with additional disadvantage that syneresis appears during the repeated uses (See Japanese Patent Publication No. 19602/1971).

(8) Other various proposals have been made to form gels from polyvinyl alcohol, including gelation by the use of phenolic compounds, such as phenol, naphtol or Congo Red, amino compounds or metals, such as titanium, chromium or zirconium. However, all of the gels obtained according to the prior proposals have disadvantages similar to those of the aforementioned polyvinyl alcohol-borax system gel (See Journal of the Chemical Society of Japan, 72, 1058 (1951) and Japanese Patent Publication Nos. 9523/1965 and 23204/1965).

(9) Also, gelation of polyvinyl alcohol by the use of a cross-linking agent or copolymerizable additive, such as aldehydes, dialdehydes, unsaturated nitriles, diisocyanates, trimethylolmelamine, epichlorohydrin, bis($\beta$-hydroxyethyl)sulfone, polyacrylic acid, dimethylol urea or maleic acid anhydride, has been well-known in the art. However, notwithstanding the additional treatment using an additional chemical agent, it was difficult to obtain a strong gel having high water content (In this connection, reference should be made to Textile Res. J., (3), 189 (1962) and the specification of British Patent No. 742,900 (1958)).

Many proposals have been previously made in connection with the method of processing or treating a gel obtained from polyvinyl alcohol. However, these previously-made proposals have disadvantages in operation or in properties of the resultant product, as will be summarized in items (1) to (4) below.

(1) Although a wet or dried membrane may be obtained by drying an aqueous solution of polyvinyl alcohol in air, such a membrane is inferior in water-proof property to form a soft and weak film having no integrity when immersed in water. Accordingly, such a membrane may be used for only limited applications (See Japanese Patent Publication No. 9523/1965).

(2) The properties of a membrane obtained by a method comprising the steps of adding an acid to an aqueous suspension containing polyvinyl alcohol and tetraethyl silicate and then drying in air, are similar to those of the membrane obtained by the method set forth in (1) above. As a modification of the method, there has been proposed a method wherein an aqueous suspension added with an acid is freeze-dried. However, the membrane prepared by the modified method becomes weaker to such an extent that it becomes scarcely possible to mold the same (In this connection, reference should be made to Japanese Patent Publication Nos. 11311/1980 and 30358/1980).

(3) A gelation method wherein an aqueous solution of polyvinyl alcohol is exposed to irradiation of Cobalt 60 (gamma-ray), is also well-known. A special equipment, i.e. an equipment for irradiating radioactive rays, is required in practice of this known method, and additionally the cost for such an irradiation is expensive. Yet, a gel obtained in accordance with this method is often so weak that a further hardening treatment or a secondary hardening step is indispensable. Accordingly, a gel obtained by this method cannot be applied for general uses other than special use in which a highly viscous liquid or soft gel is desired, for example, for use as an artificial vitreous body for filling an intraocular cavity (In this connection, reference should be made to J. Material Sci., 1974, 1815 and Japanese Patent Provisional Publication No. 55647/1975).

(4) It has been well-known since a long time ago that a gel is formed after an aqueous solution of polyvinyl alcohol is stored for one day to one week. However, such a gel is as weak as the agar gel, and may be dissolved again merely by agitating vigorously, by agitating after adding with water or by heating at some extent.

OBJECTS AND SUMMARY OF THE INVENTION

A primary object of this invention is to provide a process for the preparation of a gel for use as a cooling medium which is strong and highly elastic, free of unpleasant odor and which resists disintegration and provides a comfortable touch.

Another object of this invention is to provide a process for the preparation of a gel for use as a cooling medium and having excellent insolubility in water.

A further object of this invention is to provide a process for the preparation of an inexpensive and yet stable gel for use as a cooling medium so that the gel structure is not disintegrated or broken even by the attack of a freezing point depressing agent, such as ethylene glycol.

A further object of this invention is to provide a process for the preparation of a gel of high water content for use as a cooling medium.

A still further object of this invention is to provide a process for the preparation of a gel for use as a cooling medium, which resists freezing even when it is placed in an ice-box of a cooling box or freezing box.

Additional object of this invention is to provide a process for the preparation of a gel for use as a cooling medium, which may be molded to have desired shape and dimensions and immediately used as a final product without the need of shaping operation, or may be molded into a block and then shaped, for example by cutting, to have desired shape and dimensions.

The above and other objects of this invention will become apparent from the following description of the invention.

The process for the preparation of a gel for use as a cooling medium, according to this invention, comprises the steps of casting an aqueous solution or suspension containing a polyvinyl alcohol having a degree of hydrolysis of not less than 95 mol % and a viscosity average polymerization degree of not less than 1500 into a mold having desired shape and dimensions, cooling the cast aqueous solution to a temperature of not higher than − (minus) 6° C., and then dehydrating without thawing the cooled mass of the cast aqueous solution in vacuum until the percentage dehydration rate reaches not less than 5 wt %.

DESCRIPTION OF THE INVENTION

The present invention will now be described more in detail hereinafter.

According to the invention, an aqueous solution of polyvinyl alcohol is cooled followed by dehydration to prepare a gel excellent in mechanical strengths and high in water content. The process of this invention does not involve any additional pre-treatment or after-treatment, i.e. secondary hardening step, and the use of an acid, alkali, radical sources, irradiation of radioactive rays, organic solvents, chemical reagents or inorganic solvents other than water, otherwise essential in the gelation step of prior art process for making a gel of synthetic high polymer, is not essential at the gelation or pre-treatment step. Yet, the gel obtainable by the process of this invention may contain water at high content and has rubber-like elasticity and satisfactory mechanical strengths required for a material suited for use as a cooling medium or coolant gel.

As has been described hereinbefore, it has been well-known in the art that an aqueous solution of polyvinyl alcohol forms a gel after being stored at a temperature of from 0° to 30° C. for one day to one week. However, the resultant gel is crumbly similarly to a gel of agar, and yet unstable such that it is dissolved again merely by agitating vigorously, by agitating after adding with additional water or by heating at some extent. On the contrary, the gel obtained by the process of this invention is insoluble in water or warm water to be distinctive from the known gel as aforementioned. This means that the gel provided by the process of this invention is novel and distinguishable from the known gel prepared from an aqueous solution of polyvinyl alcohol, and the gel obtained according to this invention must be formed by a different mechanism and exhibits a patentably different function.

The polyvinyl alcohol used in the process of this invention should have a degree of hydrolysis of not less than 95 mol %, preferably not less than 97 mol %. If a polyvinyl alcohol having a degree of hydrolysis of from 80 to 88 mol %, particularly lower than 85 mol %, is used, only a weak gel is formed to fail to attain the objects of this invention.

The polyvinyl alcohol used in the process of this invention should have a viscosity average polymerization degree of not less than 1500. If not, only a weak gel is formed. In the present invention, a polyvinyl alcohol having a polymerization degree of from about 1500 to 3300 may be used, and it is recommended that a commercially available polyvinyl alcohol having a high polymerization degree (for instance, having a polymerization degree of from 1500 to 2600) be used without any treatment.

The initial step of the process of this invention is the preparation of an aqueous solution of a polyvinyl alcohol. Although the concentration of polyvinyl alcohol is not critical, when the aqueous solution contains only the polyvinyl alcohol the concentration may range within, for example, 3 to 20 wt %, preferably 7 to 15 wt %. Although the concentration may be raised, for example, up to about 90 wt %, the viscosity of aqueous solution obtained thereby exceeds 10,000 cP. at ambient temperature with frequent increase in viscosity, resulting in gelation of the solution. For this reason, the concentration of polyvinyl alcohol in the solution should not be so high to avoid difficulties in handling. On the other hand, if the concentration of polyvinyl alcohol is lower than 3 wt %, nevertheless a lower concentration may be allowable, the time required for the subsequent drying step which will be described hereinafter is prolonged, leading to an increase in expense for the drying operation.

In the process of this invention, an aqueous solution may contain solely a polyvinyl alcohol, as mentioned hereinabove. However, as will be described hereinafter, an aqueous suspension containing, in addition to the polyvinyl alcohol, a laminate structure clay mineral including a fundamental module of a tri-strata type (2:1 type) composite layer in an amount of not more than five times as much as the weight of the polyvinyl alcohol may be used. It should be noted here that a certain combined effect obtained by the combined use of a polyvinyl alcohol and a clay mineral has been already known but this known combined effect is distinctive from the effect of the present invention. More specifically, it has been well-known that a gel is formed by adding a very small amount, for instance 0.1 to 0.2 wt %, of a polyvinyl alcohol to kaolin (kaolinite) or bentonite. Based on this principle, it has been tried to change the ground of a track to have a character of avoiding the tendency of becoming dusty by sprinkling a dilute aqueous solution of a polyvinyl alcohol on the surface of the ground, or to improve the water-permeability or water-retention property of the soil by sprinkling a small amount of polyvinyl alcohol (dilute aqueous solution) over the fields. It has been further known in the art to accelerate the settling by coagulation of a clay present in the form of colloidal particles by adding a small amount of polyvinyl alcohol to muddy water. However, the gels obtained in these known techniques are very crumbly such that they can be hardly distinguishable from the common soil by appearance, and they are easily disintegrated not only in water but also in the form of dried powder (Reference should be made to J. Agr. Sci., 47, 117 (1956)). Although the distribution of soil or clay particles or the size of soil lumps may be changed by the addition of a polyvinyl alcohol, the resultant mass is not distinguishable from the common soil or extremely crumbly mud at least from the appearance thereof.

It has also been well-known that a hard membrane can be formed by adding a clay to an aqueous solution of polyvinyl alcohol followed by heating to be dried. However, the thus formed membrane is hard and inferior in water-absorptivity.

In contrast thereto, the gel containing a clay mineral and prepared according to the process of this invention is quite different from any of the known gels mentioned above in that it is insoluble in water or warm water. This means that a novel gel having an utterly distinctive function or effect from those obtainable by the gels prepared by the known combination of polyvinyl alcohol and clay mineral is prepared by the process according to this invention.

The gel containing a clay mineral and prepared by the process of this invention includes a polyvinyl alcohol in an amount of more than one fifth of the quantity of the used clay mineral. In other words, the quantity of the clay mineral should be not more than 5 times of the amount of polyvinyl alcohol, preferably not more than 3 times. If the ratio of the used polyvinyl alcohol is less than one fifth as that of the clay mineral, for instance the ratio is one tenth, the mechanical strengths of the formed gel are reduced. On the other hand, in the aforementioned techniques of improving the ground or soils, the mixing ratio of a polyvinyl alcohol to a clay mineral ranges from about 1/1000 to 1/100. The gel obtainable by the process of this invention cannot be formed under such a condition. Although the concentration of polyvinyl alcohol is not critical, when the aqueous suspension contains the clay minerals, the concentration of the polyvinyl alcohol may range for example, 1 to 18 wt %, preferably 5 to 12 wt %.

The clay minerals used in the present invention are laminate structure clay minerals, each including a fundamental module of a tri-strata (2:1 type) composite layer, the representative examples including montmorillonite, vermiculite, illite, pyrophyllite and talc. Another example is bentonite which is known as a clay for common use and easily available at low cost. This type of clay is an aggregate of colloidal particles mainly composed of montmorillonite formed by weathering of tuff, rhyolite or similar rocks and may be found at various places in Japan, for example, Hokkaido, Akita, Yamagata, Niigata, Gunma and Shimane. Montmorillonite, the main component of bentonite, is sometimes referred to as smectite, and has a laminated structure including a fundamental module made of a tri-strata (2:1 type) composite layer which includes a layer of silica having a tetrahedron structure, a layer of alumina or gibbsite having an octahedron structure and a layer of silica having a tetrahedron structure. Aluminium included in the composite layer is partially substituted by magnesium, and water and a cation, such as sodium, potassium, calcium, lithium, strontium, barium, aluminium, cesium, magnesium, ammonium or hydrogen ion, are present in-between the adjacent layers. A typical or approximate structure of montmorillonite may be represented by the formula of $(Al_{5/3} Mg_{1/2})Si_4O_{10}(OH)_2 \cdot xH_2O$ $(K, Na, Ca, H, NH_4, Mg, Al, Li, Cs, Sr, Ba)_y$.

The homologues of montmorillonite obtained by substituting the main constituting elements, i.e. aluminium and silicon, of the composite layer by other elements are well-known as nontronite (substituted by iron), hectorite (substituted by magnesium), saponite (substituted by magnesium), beidellite (substituted by aluminium), sauconite (substituted by iron, magnesium and zinc) and volkonskoite (substituted by chromium). These are referred to as montmorillonite minerals and frequently found in said bentonite.

Bentonite contains about 50 to 85% of said montmorillonite group minerals including montmorillonite, and is mixed with other constituents, such as quartz, feldspar, zeolite, kaolin, illite or mica, and cristobalite. The composition of bentonite is varied, but generally composed of about 42 to 65 wt % of $SiO_2$, about 14 to 28 wt % of $Al_2O_3$, about 11 to 23 wt % of $H_2O$, about 1 to 25 wt % of MgO, up to 4 wt % of $Fe_2O_3$, up to 3.5 wt % of $Na_2O$, up to 3 wt % of CaO, about 0.1 to 0.7 wt % of $K_2O$, up to 0.7 wt % of $TiO_2$, up to 0.3 wt % of FeO and up to 0.04 wt % of $P_2O_5$.

Although the Japanese Pharmacopeia stipulates test methods and standards for the swelling property and the gel-forming capacity of bentonite, namely the capacity for forming a pasty composite gel of magnesium oxide and bentonite, the commercially available bentonite products (reagent grade) does not pass the standards generally. However, such a commercially available bentonite product may be used in this invention without any trouble. In order to improve the swelling property, dispersibility or specific surface area of bentonite, it is a common practice to treat raw bentonite with an aqueous solution of sodium chloride, sodium hydroxide, sodium carbonate, sodium nitrate, ammonium hydroxide, sodium pyrophosphate, sodium hexametaphosphate (i.e. an oligomer of sodium metaphosphoric acid), hydrochloric acid, sulfuric acid or citric acid. Although it is not essential to treat bentonite prior to use in the present invention, the bentonite treated by any of the aforementioned solutions may be conveniently used in the present invention.

In the present invention, montmorillonite base clay minerals other than bentonite may be used, the examples being acidic clay (e.g. Kambara earth), activated clay, Fuller's earth, Florida earth and Georgia earth. Although each of these minerals contains a relatively large amount of kaolinite and other amorphous clay minerals, such as allophane, which are not included in the tri-strata composite layer clay minerals analogous to montmorillonite, the main components thereof are montmorillonite group minerals. The analogues of montmorillonite will be described in detail hereinafter.

The clay minerals used in this invention include, other than the montmorillonite group minerals, those having tri-strata (2:1 type) structures analogous to the structure of montmorillonite. A specific example of such clay minerals is Toseki (pottery stone) mainly composed of pyrophyllite and found at Goto Mine in Nagasaki, Mitsuishi Mine in Okayama and Honami and Maiko Mines in Nagano. Such Toseki is distinguishable from the montmorillonite group clays in that the content of magnesium is extremely low and in that it exhibits little swelling property. However, it resembles montmorillonite in that the basic structure thereof includes modules of silica/alumina/silica tri-strata (2:1 type) composite layers.

The talc products found in Hyogo, Okayama, Hiroshima, Yamaguchi and Nagasaki areas are differentiated from montmorillonite in that the content of aluminium therein is low and the content of magnesium therein is considerably high. However, these talc products have the laminated structures each including a fundamental module of silica/alumina/silica tri-strata (2:1 type) composite layers.

A variety of illite group clays are found in Kumamoto and Niigata areas. These illite group clays may be specifically classified depending on the contents of iron, fluorine, magnesium or other elements, and may be referred to as hydromica, glauconite, muscovite, mica, illite or other names. These clay minerals are differentiated from montmorillonite in that the content of potassium is high. However, these clay minerals have the silica/alumina/silica tri-strata (2:1 type) modules.

Vermiculite which is widely spread in Brazil, United States of America, particularly in Pennsylvania, and India has attracted public attention from long time ago and referred to as HIRUISHI or HIRUZUNA in Japan. The vermiculite is differentiated from montmorillonite in that the content of magnesium is particularly higher. However, this mineral resembles montmorillonite in that it has a laminated structure including a fundamental module made of silica (tetrahedron structure)/alumina and magnesia (octahedron structure)/silica (tetrahedron structure) tri-strata composite layer.

Other than the aforementioned tri-strata composite layer type clay minerals, artificially synthesized tri-strata composite layer type clay minerals may be also used in the present invention. For example, taeniolite found in South Greenland belongs to the illite group minerals which are enriched in potassium, fluorine and magnesium, and may be synthesized by mixing sodium fluoride, lithium fluoride, magnesium oxide and silicon dioxide followed by fusing. The thus synthesized taeniolite may be used in this invention.

It is recommended that any of the aforementioned tri-strata composite layer type clay minerals be used in the form of powders having grain size of not more than 0.15 mm (100 meshes). Said bentonite is an advantageous material, since almost all portion thereof, e.g. about 50 to 95%, is occupied by fine particles having diameter of 74 microns (200 meshes) or smaller and particularly it is enriched in coarse clay particle of 0.2 to 2 microns in size and also enriched in fine clay particles of less than 0.2 microns in size. A powdered talc product having a particle size of 150 to 270 meshes (0.1 to 0.05 mm) is commercially available as a material for cosmetic goods. When a coarse particle product having a particle size of 30 to 100 meshes (0.59 to 0.15 mm) and made of acidic terva abla, activated clay, Fuller's earth, pyrophyllite, illite or vermiculite is used in the present invention, the mechanical strength of the formed gel tends to become uneven. In order to obviate this undesirable tendency, it is preferred that these materials be pulverized to have a particle size of not less than 100 meshes, more preferably not less than 150 meshes.

In the process of this invention, powders of the aforementioned clay minerals or the clays containing the aforementioned minerals are added to an aqueous solution of a polyvinyl alcohol to be dispersed in the latter, or an aqueous suspension of a certain clay mineral is prepared and then the suspension is mixed with said aqueous solution of a polyvinyl alcohol. Alternatively, a polyvinyl alcohol may be added to an aqueous suspension of clay minerals to be dissolved therein.

Anyway, the ratio, by weight, of polyvinyl alcohol to the clay minerals contained in an aqueous solution or suspension of polyvinyl alcohol and clay minerals should be such that the weight of the clay minerals be not more than 5 times as that of the polyvinyl alcohol, as has been described above. If an excessive amount of clay minerals is used, the mechanical strength of the formed gel tends to be lowered, and this tendency is promoted when the added amount of clay minerals exceeds more than 10 times as much as that of the polyvinyl alcohol. The addition of a tri-strata composite layer type clay mineral, according to this invention, contributes to the compatibility of high water content of the resultant gel and increases in mechanical strength as far as the added amount is not excessive. The compatibility of high water content and high mechanical strength has hitherfore been considered to be a difficult problem in the course of development of high polymers for medical uses and selective permeation membranes. The clay minerals used in the present invention exert remarkably distinctive and unexpected effects in this respect. The contribution by these clay minerals appears particularly remarkable when a tri-strata composite layer type clay mineral is used in an amount of from 1/5 to 1/15 as much as the quantity of the polyvinyl alcohol. In other words, the ratio in concentration of polyvinyl alcohol to the clay mineral ranges from 5/1 to 15/1.

According to the present invention, said aqueous solution of a polyvinyl alcohol or said aqueous suspension of a polyvinyl alcohol and clay minerals may be further added with a water-soluble organic compound. In such an embodiment, the concentration of the polyvinyl alcohol should be adjusted to 2.5 to 10 wt %, and the concentration of the additional organic compound should be adjusted to 20 to 80 wt %. According to this embodiment of this invention, a gel improved in elasticity and flexibility and being not frozen even in an ice-box of a refrigerator can be obtained. The gelation and pre-treatment steps of the process of this invention do not essentially involve the use of an acid, alkali, radical sources, irradiation of radioactive rays, organic solvents or chemical reagents, otherwise widely used in the gelation step of synthetic high polymer and any secondary hardening treatment or an after-treatment for depressing the freezing point of temperature is not required. Yet, the gel obtained by the process of the present invention has a rubber-like elasticity required for a soft-type coolant gel, i.e. non-frozen hardening type coolant gel, and also has satisfactory flexibility and mechanical strengths.

The most important water-soluble organic compound added to said aqueous solution of a polyvinyl alcohol or said aqueous suspension of a polyvinyl alcohol and clay minerals prior to the formula of a gel, is a freezing prevention agent, namely a so-called freezing point depressing agent. A representative example of the freezing prevention agent is ethylene glycol. The freezing point of pure ethylene glycol is − (minus) 16° C., and the freezing points of 38 vol % and 58 vol % (60 wt %) aqueous solutions thereof are, respectively, −23° C. and −49° C. Accordingly, it is not always necessary that the aqueous solution of polyvinyl alcohol contains a particularly high content, for example 58 vol %, of ethylene glycol. The object of the addition of ethylene glycol can be attained by adjusting the concentration of ethylene glycol at about 35 to 40 vol % to depress the freezing point to about −20° C. The freezing prevention agent is not limited only to ethylene glycol. Another water-soluble polyhydric alcohol having the freezing prevention effect, such as propylene glycol (Freezing Point: −20° C. at 40 wt % substitution), 1,3-propylene glycol (Freezing Point: −24° C. at 50 wt % substitution), glycerin (Freezing Point: −21° C. at 49 wt % substitution) and 2-methyl-2,4-pentanediol (Freezing Point: −20° C. at 71 wt % substitution), may be used. By the addition of such a compound, the temperature at which the gel becomes hard can be depressed lower than −20° C. so that the gel remains satisfactory elasticity and flexibility suited for use as an ice pillow and is kept unhardened to have a touch resembling a living tissue even when it is placed in an ice-box normally maintained at −10° to −20° C. of a cooling box or refrigerator for general household uses.

The polyhydric alcohol contributes not only for a freezing point depressing agent, as aforementioned, but also for the improvement in mechanical strengths of the coolant gel of the invention. In detail, when compared to the gel obtained from an aqueous solution containing a polyvinyl alcohol only, a gel obtained from a composition containing any of said polyhydric alcohols is further increased in strength. As a result, a coolant gel suited for substitution for an ice pillow and having sufficient mechanical strength can be prepared by allowing one or more of said polyhydric alcohols to co-exist. The concentration of co-existing polyhydric alcohol may be within the range of from 20 to 80 wt %, preferably from 35 to 75 wt %. If the concentration of co-existing polyhydric alcohol is less than 20 wt %, it becomes difficult to lower the freezing or solidification point to a temperature of lower than −10° C. On the contrary, if the concentration of co-existing polyhydric alcohol is higher than 80 wt %, the freezing point is depressed excessively in some cases or conversely the freezing or solidification point is raised, with unnecessary increase in cost. The effect of depressing the freezing or solidification temperature of a gel is provided also by the addition of a water-soluble monohydric alcohol, such as methyl alcohol (Freezing Point: −20° C. at 25 wt % substitution), ethyl alcohol (Freezing point: −20° C. at 30 wt % substitution), isopropyl alcohol (Freezing Point: −19° C. at 40 wt % substitution), ethoxyethyl alcohol (Freezing Point: −21° C. at 40 wt % substitution) and ethoxyisopropyl alcohol (Freezing Point: −30° C. at 62 wt % substitution) or derivatives thereof, and further by the addition of a general water-soluble organic compound, such as acetone (Freezing Point: −20° C. at 36 wt % substitution), dimethyl sulfoxide (Freezing Point: −25° C. at 37 wt % substitution), methyl sulfonic acid (Freezing Point: −28° C. at 32 wt % substitution), ethyl sulfonic acid (Freezing Point: −24° C. at 37 wt % substitution), dimethylamine (Freezing Point: −20° C. at 33 wt % substitution), methylamine (Freezing Point: −20° C. at 20 wt % substitution) and formic acid (Freezing Point: −20° C.

at 35 wt % substitution). However, ethylene glycol, propylene glycol and glycerin are particularly preferred for the reasons that they are odorless and poor in volatility, that the object of depressing the freezing point can be attained at relatively low substitution rate by using one or a mixture of them and that the gel obtained by the addition of them is greatly improved in mechanical strengths. Trimethylene glycol (1,3-propylene glycol) and 2,4-pentanediol are inferior to ethylene glycol and propylene glycol in that light almond-like odor is generated therefrom.

In the present invention, an aqueous solution containing both of a polyvinyl alcohol and a variety of water-soluble organic compounds can be used, as described hereinabove. Other than the aforementioned polyhydric alcohols including ethylene glycol, propylene glycol, glycerin and sorbitol, any of the monosaccharides and polysaccharides may be used as the water-soluble organic compound. Also, two or more of the aforementioned organic compounds may be selected arbitrarily and used in combination.

When any one or more of the aforementioned polyhydric alcohols, e.g. a water-soluble polyhydric alcohol having 2 to 6 carbon atoms and 2 to 6 intramolecular hydroxide groups, is used as the water-soluble organic compound, the polyhydric alcohol is capsulated by the gel formed through the process of the invention, as will be described in detail hereinafter, to offer a charming and tasteful touch to the skin of a user if the gel is used in the manner so that it contacts directly with the skin of the user.

On the other hand, another highly viscous water-soluble high polymer, such as propylene glycol alginate, carrageenan or Karaya Gum, may be used in addition to the polyhydric alcohol to depress the moistened touch of the formed gel at some extent. Therefore, the moistened touch offered by the gel of the invention can be controlled by the addition of the highly viscous water-soluble high polymer to comply with the user's preference. The highly viscous water-soluble high polymers suited for this purpose are those each having a viscosity of a 2 wt % aqueous solution thereof of not less than 300 cP.(at 25° C.), the polyvinyl alcohol being exceptionally excluded from this group of high polymers. The mechanism of this advantageous effect in controlling the moistened touch of the resultant gel has not been made clear. However, it is presumable, from the fact that no such action is offered by the addition of a water-soluble low molecular weight compound, that the polyhydric alcohol is firmly captured or coated by the highly viscous high polymer solution in the course of formation of the gel according to this invention and that the highly viscous water-soluble high polymers, excluding polyvinyl alcohols, have generally relatively strong effect of inhibiting permeation of water therethrough.

Almost all of the well-known highly viscous water-soluble high polymers may be used in this invention for controlling the moistened touch of the resultant gel, the only exception being polyvinyl alcohols which are defective in water-retention property or insufficient in inhibiting permeation of water. Any natural or synthetic water-soluble high polymers may be used for this purpose, provided that the viscosity of a 2 wt % aqueous solution thereof is not less than 300 cP. at 25° C.). Examples of such high polymers are propylene glycol alginate, tragacanth gum, pullulan, gum arabi, gatti gum, karaya gum, dextrin, starch, yama (Dioscorea japonica) mucilage, Hibiscus Manihot, furcellaran, curdlan, methyl cellulose, guar gum, Locust Bean Gum, xanthane gum, agar, carrageenan, fucoidin, alginic acid, triethanolamine alginate, pectin, agarose, carboxymethyl cellulose, tamarind gum, gelatine, polyacrylic acid, sodium polyacrylate, polymethacrylic acid, polyvinyl sulfonic acid, polyvinyl pyridine, polyethyleneimine, vinylimidazole/itaconic acid copolymer, poly-(2,4-pentadiene-1-ol) and poly(N-vinyl-2-pyrrolidone). All of the high polymers referred to above have high molecular weights and form viscous aqueous solutions to be preferably used in this invention. For the purpose of illustration, the viscosities of aqueous solutions thereof will be set forth as follows:

| Sodium Alginate: | 1.5 wt % sol. = 1,100 cP.; 2 wt % sol. = 3730 cP.; 3 wt % sol. = 29,400 cP.(at 25° C.) |
|---|---|
| Carrageenan: | 2 wt % sol. = 370 cP.; 3 wt % sol. = 4,400 cp.; 4 wt % sol. = 25,356 cp. (at 25° C.) |
| Guar Gum: | 0.5 wt % sol. = 1,350 cP.; 1 wt % sol. = 3,000 cP.; 5 wt % sol. = 510,000 cP.(at 25° C.) |
| Locust Bean Gum: | 2 wt % sol. = 1,100 cP.; 3 wt % sol. = 8,200 cP.; 5 wt % sol. = 120,000 cP.(at 25° C.) |
| Propylene Glycol Alginate: | 1 wt % sol. = 400 cP. (at 25° C.) |
| Xanthane Gum: | 1 wt % sol. = 1,100 cP. (at 25° C.) |
| i-Carrageenan: | 1.4 wt % sol. = 4,000 cP. (at 25° C.) |

As will be apparent from the foregoing that the viscosities of the aqueous solutions of these high polymers are considerably higher than those of aqueous solutions of polyhydric alcohols. For the comparison purpose, the viscosities of aqueous solutions of glycerin will be set forth below:

40 wt % Solution: 4.7 cP. at 20° C.
50 wt % Solution: 6 cP. at 20° C.
60 wt % Solution: 7.3 cP. at 30° C.
85 wt % Solution: 112 cP. at 20° C.
90 wt % Solution: 160 cP. at 25° C.

As has been described hereinbefore, other than the polyhydric alcohols, disaccharides, trisaccharides and polysaccharides, well-known highly viscous water-soluble high polymers referred to above may be used in combination in the present invention. In order to prepare a gel offering comfortable touch or well moistened feeling, it is preferred, in accordance with this invention, to use one or more of pullulan, xanthane gum, tragacanth gum, carboxymethyl cellulose, polyacrylic acid, i-carrageenan, λ-carrageenan, κ-carrageenan and propylene glycol alginate.

The content of the highly viscous water-soluble high polymer ranges generally not more than 50 wt %, preferably 1 to 30 wt %, based on the weight of the aforementioned polyhydric alcohol.

In preparation of an aqueous solution or suspension containing any of the aforementioned water-soluble organic compounds, the selected water-soluble organic compound may be added to and dissolved in water simultaneously with a polyvinyl alcohol or a polyvinyl alcohol together with clay minerals; a polyvinyl alcohol may be dissolved in water and then the selected water-soluble organic compound or an aqueous solution thereof with or without clay minerals is admixed to the solution of polyvinyl alcohol, or the selected water-soluble organic compound or an aqueous solution thereof may be added with an aqueous solution or suspension containing the polyvinyl alcohol with or without clay minerals or the powders of the polyvinyl alcohol with or without powdered clay minerals followed by dissolvation and suspending the same. Anyway, the order and measures for mixing and dissolving or suspending respective components are not critical, provided that the content of polyvinyl alcohol in the final mixture ranges within 2.5 to 10 wt % and the concentration of the water-soluble organic compound ranges within 20 to 80 wt % and that the amount of the clay minerals added is not more than five times as much as the weight of the polyvinyl alcohol. Since polyvinyl alcohols are scarcely soluble in a solvent other than water, they are changed to often become transparent and fine particles of microgels dispersed in the final mixture containing said water-soluble organic compound to form a transparent suspension. However, no problem arises by the use of such a mixture of an aqueous solution suspended with fine particles.

According to the present invention, an aqueous solution of any of the said polyvinyl alcohol or an aqueous solution or suspension containing any of said clay minerals with or without a water-soluble organic compound is cast into a mold or container having desired shape and dimensions, and then the content in the mold is cooled to a temperature of not higher than — (minus) 6° C. Any known casting molds may be used for this purpose.

For the cooling agent, a cryogen (or freezing mixture) such as common salt/ice (23:77) system (−21° C.), calcium chloride/ice (30:70) system (−55° C.) or solid carbon dioxide/methyl alcohol system (−72° C.), or liquid nitrogen (−196° C.) may be used to cool the solution or suspension to a temperature of lower than −6° C. In the present invention, it is desirous that the solution or suspension be cooled sufficiently. If not, the shape and dimensions of the final product gel obtained through the vacuum drying step, as will be described below, do not take the expected shape and dimensions, in other words, is not agreed with the cavity of the used mold, with attendant disadvantage that the mechanical strengths of the final product gel are deteriorated. Although the temperature of the solution or suspension may be lowered to −269° C. using liquid helium as the cooling agent, the properties of the resultant gel cannot be improved by cooling to such a low temperature. Accordingly, the use of liquid helium is not recommended for economical standpoint of view, and it is better to use a freon refrigerator to cool the solution or suspension to a temperature of from −20° C. to −80° C., for practical application. Of course, the solution or suspension may be placed and cooled in an ice-box maintained at −10° to −20° C. of a cooling box or refrigerator for household use. The cooling temperature affects the strength of a gel obtained through the subsequent vacuum drying step. It is preferred that the solution or suspension be cooled to a temperature of not higher than −20° C., for example from −20° to −55° C., and the strength of the resultant gel is somewhat lowered when the solution or suspension is cooled to a temperature of from −6° to −20° C.

An aqueous solution of polyvinyl alcohol or an aqueous suspension of polyvinyl alcohol and clay minerals is frozen and solidified at the aforementioned cooling step to form a frozen gel. If the solution or suspension contains a water-soluble organic compound acting as a cryogen, the solution or suspension is actually not frozen but forms a gel having elastic property.

In contrast thereto, in the cooling step of the process according to this invention, the aqueous solution or suspension containing a polyvinyl alcohol is cooled and molded in a casting mold, and then the upside and/or downside cover or covers may be removed to dehydrate the molded composition in vacuum while retaining the shape and dimensions of the molded body. A further advantage of the vacuum dehydration method resides in that the molded body can be substantially evenly and rapidly dried including the deep internal portions. For this reason, the cooling and molding step of the process of this invention is very important. Moreover, the inclusion of the cooling and molding step in the process according to this invention is significant in view of the fact that surprisingly unexpected effect of improvement in mechanical strength is partly attributed to the cold molding at a low temperature.

The cooling rate at the cold molding step may be slow as a rate of 0.1° to 7° C. per minute, or may be rapid or high as a rate of 7° to 1000 ° C. per minute. The mechanical strength of the resultant gel is affected by the cooling time at some extent so that the gel cooled for 4 hours or for 10 hours is slightly improved in mechanical strength and elasticity as compared to the gel cooled for 1 hour. However, satisfactory properties for use as a substitution for an ice pillow can be obtained by cooling the gel for 1 hour.

According to the present invention, an aqueous solution of a polyvinyl alcohol or an aqueous suspension of a polyvinyl alcohol added with one or more clay minerals, i.e. not containing water-soluble organic compounds is initially frozen. After checking the completion of freezing, the frozen solution or suspension is subjected to dehydration in vacuum or dehydration under reduced pressure without thawing. The degree of vacuum at the vacuum dehydration step may be determined so that a predetermined percentage of water content is dehydrated, and the pressure at the vacuum dehydration step generally ranges not higher than 10 mmHg, preferably not higher than 1 mmHg, and more preferably not higher than 0.1 mmHg. At this step, any external cooling is not necessary for preventing the frozen molded body from thawing, but the frozen molded body is discharged from a refrigerating chamber and transferred into a vacuum dehydrating chamber to be dehydrated by sucking immediately. No external cooling is required, since the thus dehydrated body is spontaneously cooled as the water contained therein is removed by sublimation. Conversely, the frozen molded body may be heated to an extent not to cause melting of the frozen body, whereby the dehydration rate may be accelerated. In brief, the temperature at the dehydration step is not critical provided that the frozen molded body is not melted. The temperature of the dehydration step does not significantly affect the properties of the product gel. The percentage dehydration rate at this dehydration step should be not less than 5 wt % to obtain a gel having a water content of 60 to 95 wt %, based on the weight of the swelled body. More preferably, the water content of the gel should be within the range of from 60 to 90 wt %. Although the water content of the gel may be lowered below 60 wt %, it is not necessary to lower the water content of the product gel to such a low level in consideration of the aimed uses, for instance for coolant gels or cooling media. As a modified process, the water content of the gel has been once lowered to a level below 60 wt %, and then the gel is immersed in water to recover the water content within the range of 60 to 95 wt. %.

Meantime, the term "percentage dehydration rate" used throughout this specification and appended claims means the ratio of water removed at the dehydration step relative to the total weight of the frozen gel body or mass prior to dehydration. This "percentage dehydration rate" is simply calculated by dividing the weight loss during the dehydration step, the weight loss being caused by removal of water and thus equal to the weight of removed or dehydrated water, by the weight of the cooled gel prior to dehydration. For example, supposing now that 41 grams of an 8 % aqueous solution of a polyvinyl alcohol is cast in a mold and cooled. The cooled mass is subjected to vacuum dehydration followed by thawing to obtain 8 grams of a rubber-like gel having a water content of 58%. The weight loss due to removal of water at the dehydration step amounts to 41 − 8 = 33 grams. Simply by dividing 33 by 41 followed by multiplication by 100, I obtain the percentage dehydration rate in this example of about 80%. It is noted here that the "percentage dehydration rate" in this invention is defined as the percentage of weight loss due to water removal relative to the total weight of the aqueous solution or suspension prior to dehydration, and does not mean the percentage of water removed at the dehydration step relative to the weight of water contained in the aqueous solution or suspension.

As mentioned above, according to the present invention, where an aqueous solution of a polyvinyl alcohol or an aqueous suspension of a polyvinyl alcohol added with one or more of clay minerals is used, irrespective of the concentration of polyvinyl alcohol contained therein, the cast or molded body is subjected to the dehydration step after being frozen. The percentage dehydration rate, i.e. the weight reduction rate as described in detail hereinabove, should be not less than 5 wt %, preferably not less than 15 wt %. The maximum percentage dehydration rate is not particularly limited, and the percentage dehydration rate may be so high as about 98 wt %. The actual percentage dehydration rate may be selected depending on the desired strength of the product gel, because the strength of the gel is increasingly improved as the dehydration proceeds.

The body or mass formed by freezing, molding and drying is then allowed to stand at ambient temperature for thawing to obtain an elastic gel. The gel may thaw slowly or rapidly by raising the temperature thereof at a rate of 1° to 3° C./min for slow thawing or at a rate of 3° to 1000° C./min for rapid thawing. The melting point of the gel obtained by allowing an aqueous solution of polyvinyl alcohol to stand or to be stored at a temperature of about 0° to 30° C. ranges from about 15° to 29° C. In contrast thereto, the melting point of the gel obtained by the process of this invention is so high as higher than 100° C., and hence the gel obtained according to this invention may be subjected to rapid thawing by warm water or warm air. However, it is desirous that thawing be effected at a temperature of lower than 40° to 50° C. while avoiding the melting of gel at a higher temperature, a hard membraneous surface layer is formed promptly since when the gel according to this invention is dried by hot air of higher than 60° C. and even the gel according to this invention is apt to melt in hot water.

After the thawing operation, the gel can be easily removed from the cavity of a casting container or mold. This gel absorbs water when immersed in water to reach the water content of 80 to 95 wt % (based on the weight of the swelling body), and the swelling gel is kept as a tough elastic mass.

On the other hand, when an aqueous solution or suspension further added with any of the aforementioned organic compounds is used in the process of this invention, the cast mass is cooled to be a little solidified but not to be frozen and then subjected to vacuum dehydration. Although the mechanical strength of the gel is further improved as the percentage dehydration rate, i.e. the weight reduction rate of the cooled gel, increases, it is not necessary to increase the percentage dehydration rate too high to obtain strong but hard gel. In order to obtain a soft gel, the percentage dehydration rate should be not less than 5 wt %, preferably within the range of from 5 wt % to 60 wt %, and more preferably within the range of from 5 wt % to 55 wt %.

The degree of vacuum at the dehydration step of drying the gel in vacuum may be such that the gel is dehydrated to have a predetermined water content, for example at the level of below 10 mmHg, preferably below 1 mmHg, and more preferably below 0.1 mmHg. A gel obtained by dehydrating a composition containing a polyvinyl alcohol and an additional water-soluble organic compound with or without clay materials in vacuum is a milky and opaque gel forming a solid mass which is insoluble in water at ambient temperature and which does not become hard or rigid even in an ice-box of a household ice box or refrigerator.

It is supposed from the result of observation conducted using a scanning type electron microscope that the gel forms an exceedingly porous mass internally thereof having solid phase of water-insoluble polyvinyl alcohol and liquid phases of water entangled complicatedly to form a labyrinth-like network of tangled water paths. The width of the water paths is varied from ¼ to 100 microns, and the paths meander to form a complicatedly continued network. As should be apparent from the high water content, the major portion of the internal area of the gel are void filled with water. The water content of the gel is less than that of KONNYAKU (Water Content: about 97 wt %, a swelling gel of polysaccharide), but is comparable with the water content (70 to 90 wt %) of a living cell or a living tissue of human being or animals. In addition, the gel obtainable by this invention is exceedingly superior over a variety of gels of polysaccharides, such as KONNYAKU, agar, aliginic acid, carrageenan, guar gum, Locust Bean Gum or agarose, in strength and elasticity. The strength and elasticity of the gel obtained according to this invention are comparable with those of the living tissues of human being and animals. Nevertheless, the gel obtained according to this invention contains a large quantity of water, it exhibits tough elasticity and resists deformation so that it is deformed transiently when squeezed tightly by hand but it restores the original shape immediately after it is left free. It has hitherto been considered that the concurrent provision of high water content and high mechanical strength involves a difficult and incompatible problem in the course of developing a high polymer for medical uses or developing a membrane having selective permeability. The gel prepared by the process of this invention is quite different from the membrane of prior art technique obtained by drying an aqueous solution of a conventional polyvinyl alcohol in air or the aforementioned water-soluble gel formed by merely storing an aqueous solution of a polyvinyl alcohol at a temperature of from 0° to 30° C., and has a high water content and high mechanical strength, as described in detail hereinbefore.

Water contained in the gel according to this invention is scarcely exuded even when pressure is applied thereto, for example, only 1 to 2% of the contained water is exuded or effused even when a compressive force of 2 kg/cm² is applied to the gel according to this invention having a water content of 90 wt %. As should be understood from the fact that the gel retains a large amount of water persistently, the apparent specific density of the gel is substantially equal to that of water so that the gel is scarcely settled in water.

The gel prepared in accordance with the process of this invention is not adhesive. Even when about 10g each of gels respectively molded to have a plate form (8 mm×8 mm×2 mm), a cyclindrical shape (having an inner diameter of 3 mm, an outer diameter of 6 mm and a length of 6 mm) and a spherical shape (having a diameter of 4 mm), were immersed in 50 ml of water while continuing agitation for 10 days, no mutual adhesion or deformation was observed. The gel was immersed in city water for one year, it was not dissolved in water and the elasticity and the strength thereof were not changed. This is in striking contrast to the case of KONNYAKU which has been deformed seriously when it is immersed in city water for a few days.

In the present invention, the used polyvinyl alcohol is the sole material or component acting as the gelation agent, or acting as the gel forming agent. However, the presence of one or more inorganic or organic materials which do not participate in the gel forming reaction of the used polyvinyl alcohol, does not affect adversely on the properties of the formed gel. The allowable amount of such a co-existing material may be less than ½ as much as the quantity of the contained polyvinyl alcohol when the gel forming liquid is an aqueous solution containing solely the polyvinyl alcohol, and may be less than ½ as much as the total quantity of the contained polyvinyl alcohol and the clay minerals and/or the additional water-soluble organic compound when the gel forming compositions contains the clay minerals and/or the additional organic compound. On the contrary, a material which reacts with polyvinyl alcohol (or polyvinyl acetal, polyvinyl butylal or other similar compounds which may be construed as an equivalency or modification of polyvinyl alcohol) to form a composite gel or a material which reacts with polyvinyl alcohol or a homologue to modify the same, should not be present because the gel forming capacity attained solely by the used polyvinyl alcohol is often adversely affected by the presence of even a small amount of such a material to make it difficult to form a gel having improved mechanical properties and high water content. Examples of such materials which affect adversely on the gel formation according to this invention are those recognized to have interaction between polyvinyl alcohols or homologues, the specific examples being colloidal alkali silicate (See the specification of U.S. Pat. No. 2,833,661 (1958)), colloidal silica (See the specification of U.S. Pat. No. 2,833,661 (1958)), alkaline colloidal silica (See Japanese Patent Provisional Publication No. 153779/1979), organic silica compounds (see "Vinyl Acetate Resin", page 93, published by Nikkan Kogyo Shinbun-sha (1962)), tetraalkyl silicates (See Japanese Patent Publication Nos. 30358/1980 and 11311/1980), boron and borate (See French Patent No. 743,942 (1933)), phenol, naphthol, meta-cresol, pyrogallol, salicylanilide, disalicylbenzidine, resorcinol and polyamines (See kobunshi Kagaku (Chemistry of Polymer), 11, (105)23, (1954)), and kaolin (Nature, 170, 461 (1955)). All of these materials form composite gels with a polyvinyl alcohol depending on the co-existing quantities thereof to lower the inherent mechanical strength and rubber-like elasticity of the gel prepared by the present invention, and hence the presence thereof should be rather avoided.

The gels prepared in accordance with the process of the invention while using an aqueous solution of a polyvinyl alcohol or an aqueous solution containing a polyvinyl alcohol and an additional water-soluble organic compound are always opaque gels of white color. The appearance or hue thereof resembles a slice of raw cuttle-fish, rice cake, white UIRO (a kind of paste product made of powdered rice), a boiled fishplate or a white meat portion of raw fish. The touch of the gel resembles a flesh of human being or an animal, a slice of raw cuttle-fish, a fish meat, rice cake CHIKUWA (roasted fish paste), HAMPEN (fish minced and steamed), a chaomai, KONNYAKU or sausage. On the other hand, the gel prepared from an aqueous suspension containing one or more clay minerals has a hue which is differentiated by the hue of the used clay mineral. A white gel is obtained when an activated clay, white bentonite, talc or white illite is used. The hue of the resultant gels are changed depending on the hues of the clay minerals when colored materials, such as light brown bentonite or light yellow acidic terra abla, are used. In practice of the present invention, a gel having desired hue can be prepared by dissolving or suspending fine powders of a coloring agent, such as Congo Red (red color), alkaline phenolphthalein (Red color), neutral methyl orange (yellow color), phthalonitrile (lightly reddish brown, commercially available), phthalocyanine Blue or Phthalocyanine Green, in an aqueous suspension containing one or more of clay minerals.

In the process of this invention, an aqueous solution or suspension containing at least a polyvinyl alcohol may be cast in a container or mold having desired shape and dimensions to obtain a swelling gel having desired form, for instance in the form of particles, membrane, lump, plate cylindrical or other shape. A gel having a contour in registry with the final product may be molded, or alternatively a final product of desired shape and dimensions may be cut out from a block of gel through subsequent machining step.

There has not been clarified the mechanism of the formation of a gel, which is quite different from the conventionally-known gel of polyvinyl alcohol and is formed by cooling, molding and drying an aqueous solution for suspension according to the process of this invention. However, it is presumable that a numerous hydrogen bonds are formed intramolecularly and intermolecularly of polyvinyl alcohol molecules at the cooling, molding or casting and drying steps.

Anyway, it is believed that the gel and the process according to this invention as defined in the appended claims are firstly found by the inventor of the present invention.

Nevertheless, the gel prepared in accordance with the present invention does exude only little water contained therein even when it is compressed or squeezed extensively.

The rubber-like gel having high water content and prepared according to the process of this invention retains the initial fresh-looking and soft-touch by sealingly filling the same in a transparent or opaque bag made of a soft material, such as polyvinyl chloride, polyethylene or polypropylene.

The gel obtained by the process of this invention has a touch resembling a living tissue by itself, and may be used, as an elastic or resilient material, as a substitution material for an ice pillow or an ice bag. The gel prepared from a composition containing an additional water-soluble organic compound is not frozen to be rigid or solidified even if it is placed in an ice-box of a household cooling box or refrigerator to exhibit always a fresh touch and elasticity similar to KONNYAKU. On the other hand, the gel obtained from the solution or suspension which does not contain an additional water-soluble organic compound becomes hard or solidified in its entirety when it is cooled in an ice-box of a cooling box due to freezing of the water included in the cooled gel. As a result, the desired fresh touch and rubber-like elasticity inherent to the gel according to the present invention cannot be exhibited occasionally to become unsuited for use as an ice pillow until the frozen water at the surface of the initially frozen gel thaws. However, according to the present invention, a process for the preparation of non-hardening gel is provided, as will be described in detail hereinbelow.

Namely, in accordance with a further aspect of the present invention, a gel containing a polyvinyl alcohol with or without a clay mineral is dipped in a water-soluble organic compound or an aqueous solution thereof, for instance in ethylene glycol to substitute at least a portion of water contained in the gel for ethylene glycol, whereby a coolant gel similar to the aforementioned gel obtained from a composition containing an additional water-soluble organic compound which is not frozen to become hard in a general ice-room, can be easily prepared. The freezing point of pure ethylene glycol is $-16°$ C. (Specific Heat at 20° C.: 0.56 cal/g-.deg.) The freezing points of 38 vol % and 58 vol % (60 wt %) aqueous solutions of ethylene glycol are, respectively, $-23°$ C. (Specific Heat at 20° C.: 0.85, Specific Heat at $-4°$ C.: 0.91) and $-49°$ C. (Specific Heat at 20° C.: 0.76). Accordingly, it is not necessary to replace all water content in the gel by ethylene glycol, and desired freezing point depressing effect or hardening prevention effect can be attained by replacing about 35 to 40 vol % of water by ethylene glycol while avoiding sharp depression in specific heat or cooling heat capacity of the aqueous solution confined in the gel. All of the water-soluble organic compounds referred to hereinbefore as the materials to be mixed to the aqueous solution or suspension for depressing the freezing point thereof may be used at this step of replacing a portion of water contained in the gel.

A non-hardening type coolant gel may also be prepared by allowing the gel to contact with an aqueous solution of an inorganic salt, such as aqueous solution of magnesium chloride, aqueous solution of sodium chloride or aqueous solution of calcium chloride, to replace a portion of water in the gel by the aqueous solution of such an inorganic salt, For example, the freezing points of 17 to 22 wt % aqueous solution of magnesium chloride, 23 to 24 wt % aqueous solution of sodium chloride and 19 to 30 wt % aqueous solution of calcium chloride are, respectively $-20°$ to $-33°$ C., $-17°$ to $-20°$ C. and $-16°$ to $-51°$ C. The freezing point of water contained in the gel may be, therefore, depressed by allowing said water-contained gel with any of said aqueous solutions of inorganic salts. Similar effects may be obtained by the addition of various water-soluble inorganic compounds including bromides of iron, manganese, barium and sodium, chlorides of iron, cobalt, nickel, ammonium and copper, nitrates of iron, cobalt, nickel, magnesium, calcium, sodium, copper, zinc and ammonium, sulfates of lithium, potassium, ammonium and cadmium, pyroselenite of ammonium, selenate of potassium, antimony sulfides of potassium and lithium, and hydrosulfide of barium. Amongst these water-soluble inorganic compounds, magnesium chloride, calcium chloride, sodium chloride, ammonium chloride, magnesium nitrate and zinc nitrate are particularly preferred, because they are odorless, harmless and inexpensive and additionally the gel can be prevented from freezing or solidifying by the replacement of a relatively small amount of contained water by the aqueous solution of such an inorganic salt.

In order to replace at least a portion of water contained in a gel prepared from an aqueous solution of a polyvinyl alcohol or an aqueous suspension further added with one or more clay minerals, it is convenient to adopt a direct contact method in which a water-containing gel is allowed to contact with an inorganic salt directly.

When said gel is immersed in a water-soluble organic compound or a water-soluble inorganic salts or an aqueous solution thereof, the freezing point of water at the surface area of the gel has been depressed after the lapse of 2 to 3 minutes. The freezing point depressing effect extends deeply in the internal portion of the gel for additional 30 minutes to 10 hours so that the freezing point of the portions of 1 to 10 cm from the surface is depressed enough for satisfying the object of this invention. The liquid, in which the gel is immersed, may be agitated or circulated at this step with attendant advantage that the time required for immersion is shortened.

After a water-soluble organic compound or water soluble inorganic salt has been once impregnated into a gel, the aqueous solution thus confined in the gel is scarcely pressed out even by applying high compression. After the operation of cooling the gel to $-25°$ C. to be used as a coolant is cyclicly repeated, the aqueous solution in the gel and the gel structure are stable and no problem arises by such a repeated cycle.

According to a still further aspect of the invention, a process for the preparation of composite coolant gel structure is provided, said composite gel including a first layer (A) containing said polyvinyl alcohol and one or more of said additional water-soluble organic compounds and a second layer (B) containing solely said polyvinyl alcohol. The process provided in accordance with this aspect of the invention is a process for the preparation of a gel for use as a cooling medium and having a composite layer structure including a first gel layer (A) and a second gel layer (B) of higher water content; wherein said first gel layer (A) is prepared by the steps of casting an aqueous solution or suspension containing a polyvinyl alcohol having a degree of hydrolysis of not less than 95 mol % and a viscosity average polymerization degree of not less than 1500 and further containing an additional water-soluble organic compound into a mold having desired shape and dimensions, the concentration of said polyvinyl alcohol in said aqueous solution or suspension being within the range of from 2.5 to 10 wt % and the concentration of said additional water-soluble organic compound in said aqueous solution or suspension being within the range of from 20 to 80 wt %, cooling the cast aqueous solution or suspension to a temperature of not higher than −

(minus) 6° C., and then dehydrating without thawing the cooled mass of the cast aqueous solution or suspension in vacuum until the percentage dehydration rate reaches not less than 5 wt %; and wherein said second gel layer (B) is prepared by the steps of casting an aqueous solution of a polyvinyl alcohol having a degree of hydrolysis of not less than 95 mol % and a viscosity average polymerization degree of not less than 1500 into a mold having desired shape and dimensions, cooling the cast aqueous solution to a temperature of not higher than − (minus)6° C. to freeze the same to form a mass of desired shape and dimensions, thereafter dehydrating without thawing the frozen mass of the cast aqueous solution in vacuum until the percentage dehydration rate reaches not less than 5 wt %, and then, if necessary, swelling the once dehydrated mass with water to have a water-content, based on the weight of the swelled mass, of from 60 to 95 wt %.

In this embodiment of the invention, as the gel layer at the side for contacting with a human body portion provided is the first gel layer (A) obtained by cooling an aqueous solution or suspension containing both of a polyvinyl alcohol and an additional water-soluble organic compound and having sufficient soft touch, flexibility and elasticity and yet having no tendency of becoming hard even if it is placed in an ice-making chamber of a cooling box or refrigerator, and the second gel layer (B) which is to be frozen to become hard is provided at the side which does not contact with any portion of a human body. With this construction, the hardening gel layer (B) is interposed between the non-hardening gel layer (A), which does not contact the body portion of a user. For example, by the provision of about 1 to 1.5 cm thick soft layer made of said first non-hardening gel layer (A), the product having a composite layer structure may be comfortably used as a substitution for an ice pillow with the touch as if the user contacts with a cooled mass through a layer made of KONNYAKU.

A composite layer structure may be made by preparing a plate-shaped gel layer (B) of freezing or hardening type (high water content gel) and a plate-shaped gel layer (A) of non-freezing type (non-hardening type) and then laminating these gel layers to form a piled product of A/B or A/B/A. The thus formed product may be applied for use while being contained in a bag made of an appropriate soft film. Since the gels constituting the composite layer structure of this embodiment are rubber-like solids at ambient temperature, the composite layer gel may be ready for use by wrapping with a polyethylene bag or another suitable material if the bag initially wrapping the composite layer gel is accidentally broken. In contrast to the conventional coolant gel product made of a porridge-like gel composition which is exposed to the risk of loss due to flowing-out of the porridge-like gel when a container or bag containing the same is broken or even through a fine pinhole or crack, the coolant gel according to this invention is not susceptible to such a risk. The gel layers (A) and (B) may be molded to have the shapes and dimensions coincident with the final used forms, or alternatively they may be cut out from larger blocks followed by subsequent shaping.

The non-freezing type gel (layer (A)) has been incorporated in a composite layer type coolant gel structure by the inventor in the first place in order to improve the touch of the coolant product, and no such trial or proposal has been made by others until now. According to another advantageous feature of this invention, a freezing type gel (layer (B)) having a high water content is combined with the aforementioned layer (A) with the aim to improving and prolonging the cooling capacity of the product.

As another application, the aqueous solution or suspension containing the polyvinyl alcohol and the additional water-soluble organic compound, may be used as a cooling medium for cooling the head of a patient. For this purpose, the aforementioned solution or suspension prepared according to this invention is cast into a mold for molding a helmet having a shape and dimensions for completely surrounding the areas of the head covered with hairs or eyebrows, and then cooled and vacuum-dehydrated in accordance with the procedure described above and defined in the appended claims.

More particularly, a gel prepared according to the process of this invention and including a polyvinyl alcohol added with a relatively large quantity of glycerin, propylene glycol or ethylene glycol may be used as a compensation agent for compensating the harmful secondary effect of the chemotherapy for curing cancer, as will be described in detail hereinafter. In the chemotherapy for curing cancer wherein a variety of antibiotics is administered to a patient, if the patient suffers harmful secondary effect to lose his hairs, falling-off of hair can be prevented by cooling the head by a helmet provided with a lining made of the gel prepared by the process of this invention. The falling-off of hair of the patient due to administration of antibiotics and the prevention effect attainable by the use of a helmet provided with the coolant gel according to this invention are most appreciable when Adriamycin is used as the antibiotics for the therapy of cancer.

Adriamycin (1,4-hydroxydaunorbicin; doxorubicin) was separated from Streptomyces peucetius var. caesius, a mutant of Streptomyces peucetius, at the Fermitalia Research Laboratories in Italy in 1967, and was well-known as an antibiotic having an anthracycline type chemical structure resembling Daunorubicin (Daunomycin). Details thereof will be apprent by referring to, for example, "Biochemistry Data Book", I, page 1415 (1979), edited by Bio-chemical Society of Japan and published by Tokyo Kagaku Dojin; Kazuo Ohta, "Status Quo and Trend of New Medicines", the last volume page 168 (1972), edited by, Kyosuke Tsuda et al. and published by Chijin Shoken; A. Dimarco et al., "Cancer Chemother. Rep., (1)", 53, page 33 (1969); and F. Arcamone, "Chim, Ind. (Milano)", 51, page 835 (1969). The antitumor activity thereof exhibits in wide range and is applied, singly or in combination of other chemotherapeutics in a combination chemotherapy, for the therapy of various diseases including gastric cancer, pulmonary cancer, ovarian tumor, embryonal carcinoma, infantile carcinoma, infantile sacrosis, mammary cancer, Wilm's tumor, lymphatic leukemia, non-lymphoid leukemia, Hodgkin's disease, mouse sarcoma 180, mouse lymphatic leukamia P388 and mouse leukemia L1210. In this connection, reference should be made to the following references, which will be incorporated herein as a part of this specification; A. Dimarco et al., "Cancer Chemother., Rep. (1)", page 33 (1969); Kazuo Ohta, "Status Quo and Trend of New Medicines", the last volume, page 168 (1972), edited by Kyosuke Tsuda et al. and published by Chijin Shokan; Takeo Fujimoto "HAKKETSU-BYO NO SUBETE" (General Report on Leukemia), page 412 (1981), edited by Yoshihisa Nakao and published by NANKODO Co., Ltd.; and "Handbook of Medicines", page 1014 (1981), edited by OSAKA-FU BYOIN YAKUZAISHI KAI (Association of Pharmacists Belonging to Hospitals in Osaka) and published by Yakugyo jiho-sha. It has been reported that it has a medicial efficacies superior over the well-known carcinostatics, such as Daunomycin and Daunorubicin (See "Handbook of Medicines", page 1014 (1981), edited by OSAKA-FU BYOIN YAKUZAISHI KAI, and published by Yakugyo Jiho-sha; and Kazuo Ohta, "Status Quo and Trend of New Medicines", the last volume, page 168 (1972), edited by Kyosuke Tsuda et al. and published by Chijin Shokan). However, the toxicity thereof is intense (see Kazuo Ohta, "Status Quo and Trend of New Medicines", the last volume, page 168, edited by Kyosuke Tsuda et al. and published by Chijin Shokan), and it was reported that Adriamycin showed frequently more harmful secondary effect than Daunorubicin (See "Handbook of Medicines", page 1014 (1981), edited by OSAKA-FU BYOIN YAKIZAISHI KAI, and published by Yakugyo Jiho-sha, and Takeo Fujimoto, "HAKKETSU-BYO NO SUBETE", page 412 (1981), edited by Yoshihisa Nakao and published by NANKODO CO , Ltd.).

As the harmful symptoms caused by the administration of this medicine, there may be mentioned stomatitis, nausea, vomitus, pyrexia, mycocardiopathy, nephropathy, hypohepatia, anorexia, oligoerythrocythemia, hypoleukocytosis, thrombocytopenia and alopecia. Particularly, the alopecia is known as a serious harmful secondary effect which is frequently observed (See Shigeyuki Osamura et al., "HAKKETSU-BYO NO SUBETE", page 189 (1981), edited by Yoshihisa Nakao and published by NANKODO Co., Ltd.; "Handbook of Medicines", page 1014 (1981), edited by OSAKA-FU BYOIN YAKUZAISHI KAI and published by Yakugyo Jiho-sha; and Kazuo Ohta, "Status Quo and Trend of New Medicines", the last volume, page 168 (1972), edited by Kyosuke Tsuda et al. and published by Chijin Shokan ). In order to alleviate the harmful secondary action, it has been tried to ameliorate the administration method or to develop the combination chemotherapy. However, the alopecia cannot be avoided generally, and regeneration of hair by the later recuperation is not expected (See Kazuo Ohta, "Status Quo and Trend of New Medicines", the last volume, page 168 (1972), edited by Kyosuke Tsuda et al. and published by Chijin Shokan). For instance, Adriamycin is administered by intravenous drip at every 25-day-interval, more than 90% of the patients suffer depilatory symptom and the loss of hairs caused thereby gives considerable mental pains to the patients. In addition, this harmful action might raise a serious problem that some patients who are unfamiliar with the modern medical therapy have suspicion or distrust to the treatment or administration.

The cause for this alopecia considered is that the antibiotics administered into the organism is absorbed by the cells of hair. In order to suppress the absorption rate, it has been tried to cool the cells of hair to a temperature of about 25° C. at which the metabolism of living cells is remarkably ceased. The antibiotics administered by intravenous drip reaches the head of the patient after about several minutes and is discharged therefrom after about 30 to 40 minutes, and is not left in the blood flows circulated in the head after then. In view of the result of observation set forth above, it has been investigated to develop a practically applicable method of cooling the head of a patient for about 40 minutes after the antibiotic is administered by intravenous drip. Prior-made trials include the method in which an ice-bag is wound around the head, the method in which a helmet made of sponge is impregnated with a large amount of cold water and fitted on the head, and the method in which the inner cavities of a cap molded from a bag made of, for example polyvinyl chloride and having cavities are filled with a jelly, agar, a polyvinyl alcohol or a borax gel. However, the method using the ice-bag is inconvenient in that water and ice contained in the bag flow downwards in the wound bag to be dislocated unevenly to make it difficult to cool the entire head portion uniformly. The helmet made of sponge is inferior in water-retention capacity, resulting in that a large quantity of cold water is oozed out and dropped from the sponge. For this reason, this method is not practical, as well. In the method of using a cap molded from a bag of polyvinyl chloride and having inner cavities in which a high water content gel is filled as the cooling medium, it is difficult to hold the original shape of the cap or helmet, because the conventionally-known high water content hydrogels are either fluidal, for example a polyvinyl alcohol gel, a borax gel and carboxymethyl cellulose gel, or soft and crumbly solids, for example gels made of agar, jelly, carrageenan and alginic acid. A further disadvantage of the known gels is that they are poor in elasticity not to fit intimately over the head of a patient.

Many proposals have been made to prevent the cooling medium from deformation or uneven dislocation, including a method of sawing the helmet over the whole area in the longitudinal and transverse direction to form a number of partitioned regions, thereby to prevent the fillers contained in separate regions from moving, and a method of providing a number of closed chambers or small cellular cavities into which cooling medium is filled. However, a gap or space is left between the head and the helmet, since the helmet per se lacks elasticity required for intimate contact.

The gel prepared in accordance with the process of this invention and including a water-soluble organic compound, such as glycerin, propylene glycol or ethylene glycol, is improved in water-retention property so that the water retained thereby scarcely evaporates. Even if some portions of water evaporate, disadvantageous drying and hardening of the gel are avoided since the gel is improved in water-retention property due to the contained organic compound, such as a polyhydric alcohol. As a result, the gel does not lose its inherent flexibility and elasticity without suffering deformation, and maintains high mechanical strength and comfortable touch. According to this invention, a gel forming composition containing a polyvinyl alcohol added with an aqueous solution of a water-soluble organic compound, such as a polyhydric alcohol, may be cast in a helmet molding mold followed by cooling, solidification and shaping, and then partially dehydrated without thawing to obtain a helmet. This helmet can be immediately used as a head cooling helmet without the need of being wrapped by a bag made of, for example polyvinyl chloride or similar material. Since the gel prepared in accordance with the process of this invention is highly elastic and extensible, a helmet made of the gel of this invention is well fitted on the heads of many patients having different shape and dimensions.

The shape of a helmet used for this purpose is somewhat different from the shapes of the helmets conventionally used for safety helmets at the job sites or used by batters in the baseball game, and the helmet suited for this medical therapy purpose should extend to cover not only the entire portion of the head on which hairs grow but also the side whiskers, i.e. hairs at left and right sides of the head, preferably to cover the portions of the face on which eyebrows grow. The helmet according to this invention for use in medical therapy may be easily produced by using a mold prepared by modifying the molds used for the production of helmets for the operators of motorcycles or the players of ice hockey game.

EXAMPLES OF THE INVENTION

The present invention will now be described more specifically with reference to examples thereof. However, it is noted here that the invention should not be limited only to the following examples, but it is interpreted that the spirit and scope of this invention is defined only by the appended claims.

EXAMPLE 1

86 g of a commercially available powder (Water Content: 7 wt %) of a polyvinyl alcohol having a degree of hydrolysis of 97 mol %, a viscosity average polymerization degree of 1700 and a viscosity at 20° C. of a 4% aqueous solution thereof of 26 cP. was dissolved in 914 g of water to obtain an 8.0 wt % aqueous solution of polyvinyl alcohol.

41 g of the aqueous solution was poured into a polyethylene beaker having a bottom of 8 cm in diameter, subjected to cooling operation $-50°$ C.$\times 0.7$ hr. to be frozen for molding, and then subjected to vacuum dehydration for 6 hours. After thawing, 8 g of a white transparent rubber-like gel having a water content of 58 wt % was obtained. The percentage dehydration rate calculated according to the definition as described hereinbefore to learn that the weight reduction rate of the frozen body after drying was 80 wt %. The gel was immersed in 10 ml of city water for 6 hours to allow the gel to absorb water. As the result of immersion, the weight of the gel reached 14 g which corresponded to a water content of 76 wt %. A loading of 2 kg/cm$^2$ was applied on the gel, to find that no deformation and exudation of water was observed. The water-retention rate of the swelled gel was 99%.

The swelled gel was allowed for standing in an ice chamber (maintained at $-15°$ C.) of a cooling box for 3 hours to harden the gel to obtain an ice block. 10 g of the gel of ice block form was immersed in 10 ml of warm water maintained at 40° C. to be slowly softened to obtain a gel which was restored to the original rubber-like gel high in elasticity. In view the result of this simple test, it was ascertained that the gel could be used as a substitution material for ice and as a coolant or cooling medium.

COMPARATIVE EXAMPLE 1

41 g of the aqueous solution of polyvinyl alcohol as prepared in Example 1 was poured into a square container having a bottom of 8 cm$\times$8 cm square and then allowed to stand at room temperature for 2 days. The thus obtained material was a colorless, transparent and soft swelled membrane. The membrane was immersed in city water for 6 hours to reveal that a portion thereof was dissolved in water and the membrane exhibited an adhesive property in itself. A rubber-like gel obtained by Example 1 could not be formed in this Comparative Example.

COMPARATIVE EXAMPLE 2

A commercially available polyvinyl alcohol having a degree of hydrolysis of 78.5 mol %, a viscosity average polymerization degree of 1700 and a viscosity at 20° C. of a 4% aqueous solution thereof of 30 cP. was used in place of the polyvinyl alcohol used in Example 1. The operation sequence was the same as in Example 1. 7.4 g of a frozen, molded and dried body having a water content of 55 wt % was obtained. This body was softened at 5° C. after thawing, and it was observed that a large quantity of a concentrated aqueous solution of polyvinyl alcohol was phased-out although a small amount of a gel layer or phase was present.

COMPARATIVE EXAMPLE 3

Using a commercially available polyvinyl alcohol having a degree of hydrolysis of 99.2 mol %, a viscosity average polymerization degree of 500 and a viscosity at 20° C. of a 4% aqueous solution thereof of 5.6 cP. in place of the polyvinyl alcohol as used in Example 1, an 18 wt % aqueous solution was prepared and 20 g of the solution was frozen, molded and dried. The result was that 13 g of a crumbly gel resembling an agar gel and having a water content of 72 wt % was obtained, and that the resultant gel had only little elasticity.

EXAMPLE 2

65 g of a commercially available powder (Water Content: 8 wt %) of a polyvinyl alcohol having a degree of hydrolysis of 99.4 mol %, a viscosity average polymerization degree of 2600 and a viscosity at 20° C. of a 4% aqueous solution thereof of 66 cP. was dissolved in 935 g of water to obtain a 6 wt % aqueous solution. Generally in accordance with the procedure as described in Example 1, 170 g of the solution was frozen and molded, and then the frozen body was subjected to dehydration in vacuum for 10 hours. After thawing, 97 g of white, opaque and highly resilient gel (Water Content: 89 wt %, Percentage Dehydration Rate: 43 wt %) was obtained. The gel having a thickness of about 2 cm was immersed in 100 ml of city water for 6 hours, whereby the gel absorbed water and the weight of the gel reached 143 g (Water Content: 93 wt %). The volume of water squeezed from the gel by applying a loading of 2 kg/cm$^2$ was only 3 ml. This water loss corresponded to about 2% of the contained water. This gel was subjected to a cooling and heating cycle similar to Example 1 to ascertain that the gel could be well suited for use as a coolant similar to the gel obtained in Example 1.

COMPARATIVE EXAMPLE 4

Using the same polyvinyl alcohol having a polymerization degree of 500 as used in Comparative Example 3, an aqueous solution of polyvinyl alcohol having a raised concentration of polyvinyl alcohol of 30 wt % was prepared. 120 g of the aqueous solution was molded by freezing the same under a condition of $-73°$ C.$\times 1$ hr, and then the molded body was subjected to dehydration in vacuum for 6 hours. After allowing 106 g (Water Content: 66 wt %) of the frozen, molded and then dried body to thaw, the body was immersed in water for 8 hours, whereby it absorbed water to have a weight of 120 g (Water Content: 70 wt %) to become extremely soft with a portion thereof being deformed to be dissolved in water.

EXAMPLE 3

10.9 g of the same powder (Water content: 8.5 wt %) of the polyvinyl alcohol as used in Example 2 was dissolved in 89 g of water to obtain 90 g of a 10 wt % aqueous solution, which was poured into a polyethylene container having a bottom of 10 cm×10 cm and then cooled at −42° C. for one hour to freeze and mold the same followed by dehydration in vacuum for 4 hours.

After allowing to stand for thawing, 53 g of a gel (Water Content: 83 wt %, Percentage Dehydration Rate: 41 wt %) was obtained. A compressive force of 2 kg/cm$^2$ was applied to a piece cut out from the gel and having a size of 1 cm×10 cm×0.9 cm. The shape and dimensions of this elastic gel was restored to the original states immediately after the compressive force was removed. The gel was subjected to repeated 50 times cycle of cooling at −15° C. followed by softening at 40° C. to ascertain that the gel retained the original state and was suitable for use as a useful coolant.

EXAMPLE 4

13 g of the same powder (Water Content: 8.5 wt %) of the polyvinyl alcohol as used in Example 3 was dissolved in 89 g of water to obtain 90 g of an 11.6 wt % aqueous solution, which was cast into a mold for molding 18 pieces of a plate-shape mass of 1 cm×1 cm×5 cm. After cooling the pieces to freeze and to mold the same at −53° C. for one hour, the mold was disassembled to remove the molded masses, which were immediately dehydrated in vacuum for 6 hours to obtain 48 g of gel pieces (Water Content: 78 wt %, Percentage Dehydration Rate: 47 wt %). The gel piece was subjected to a tensile test to reveal that the test piece was not broken until the applied tensile strength reached 5 kg/cm$^2$. Also, the gel was subjected to a cooling and heating test cycles similar to the test conducted in Example 3 to ascertain that the gel had excellent properties similar to those of the gel obtained in Example 3.

EXAMPLE 5

Using the same powder of the polyvinyl alcohol as used in Example 3, 170 g of a 6 wt % aqueous solution thereof was prepared. The solution was divided into five equal parts, each of which was poured into a polyethylene beaker (Volume: 50 ml) followed by cooling at −50° C. for one hour to freeze and mold the same. The molded masses were subjected to dehydration in vacuum, respectively, for 1 to 4 hours. The thus dried masses were immersed in water for 6 hours, and the weight of each mass was measured. The results are shown in the following Table.

| Drying Time (hr.) | Dried Gel Weight (g) | Dried Gel Water Content (wt %) | Percentage Dehydration Rate (wt %) | Swelled Gel Weight (g) | Swelled Gel Water Content (wt %) |
|---|---|---|---|---|---|
| 1 | 27 | 92 | 21 | 29 | 93 |
| 2 | 26 | 92 | 24 | 29 | 93 |
| 4 | 19 | 89 | 44 | 23 | 91 |

The tensile strengths of the swelled gels were tested to obtain the following results.

| Drying Time (hr.) | Tensile Strength (Broken kg/cm$^2$) |
|---|---|
| 1 | 1 |
| 2 | 2 |
| 4 | 3 |

The gels were immersed in city water at room temperature for a period of more than 90 days, and it was ascertained that no mutual adhesion or deformation occurred and the strengths of the gels were not changed substantially. The result of cyclic cooling and heating test was comparable to that obtained in Example 3.

COMPARATIVE EXAMPLE 5

10 g of agar powder was dissolved in 90 g of warm water of 96° C. to prepare a 10% aqueous solution. The aqueous solution was allowed to stand at room temperature. When the temperature of the solution was lowered to 47° C., it was solidified to form a gel. The gel was not elastic, and was broken to pieces very easily by picking by fingers. A cut piece (1 cm×10 cm×1 cm) was subjected to a tensile test to learn that the tensile strength thereof was far lower than 1 kg/cm$^2$.

COMPARATIVE EXAMPLE 6

10 g of κ-Carrageenan was dissolved in 90 g of warm water of 92° C. to obtain a 10% aqueous solution, which was allowed to stand for cooling. When the temperature of the solution reached 47° C., the solution was solidified to form a gel. The gel was immersed in a 3% aqueous solution of potassium chloride (hardener), but the gel was not grown to be left in the form resembling boiled rice particles. The gel was collapsed by picking by fingers to be changed to a paste form.

EXAMPLE 6

10 g of the swelled gel obtained in Example 1 was immersed in 11 g of ethylene glycol for 16 hours. As the specific gravity of the liquid containing the gel was changed from the initial value of 1.11 (20° C.) to a constant value of 1.07 (20° C.), the concentration of ethylene glycol in the water phase contained in the gel reached 50 wt %. The gel was cooled to −29° C., but it did not become hard by freezing to be held in the form of initial elastic gel of white color. The gel was subjected to repeated 30 cycles of cooling to −25° C. and heating to 40° C. to ascertain that the touch of the gel was not changed to retain the initial elasticity and strength resembling a living tissue so that it was well suited for use as a coolant gel.

EXAMPLE 7

140 g of the gel (Water content: 93 wt %) obtained in Example 2 was immersed in 50 g of glycerin for one night. The specific gravity at 20° C. of the liquid containing the gel was lowered from the initial value of 1.27 to 1.10, and the viscosity thereof at 20° C. was changed from the initial value of 1500 cP. to 4 cP.. From this fact, it was learned that the concentration of glycerin in the aqueous solution in the gel reached 40 wt %. The gel was cooled to −15° C., but the gel did not become hard to retain the initial fresh appearance and the gel was well suited for use as a coolant gel similar to that obtained in Example 6.

EXAMPLE 8

50 g of the gel (Water content: 83 wt %) obtained in Example 3 was immersed in 20 g of propylene glycol for 8 hours. By ascertaining that the specific gravity of the liquid containing the gel reached a constant value of 1.02, it was learned that the aqueous solution in the gel contained 30% of propylene glycol. The specific heat of the liquid containing the gel was 0.92 cal/g deg. at $-1°$ C. and 1.92 cal/g deg. at $-15°$ C. The gel was cooled to $-15°$ C. to ascertain that it did not become hard by freezing and had a form of rubber containing water and resembling a living tissue. The gel was well suited for use as a coolant gel similar to that obtained in Example 6.

EXAMPLE 9

40 g of the gel (Water Content: 78 wt %) obtained in Example 4 was immersed in 50 ml of an aqueous solution of calcium chloride (Specific Gravity: 1.29 at 20° C., 30 wt %) to ascertain that the specific gravity of the liquid containing the gel reached a constant value of 1.18 (at 20° C.). This fact revealed that the concentration of calcium chloride in the aqueous solution contained in the gel reached 20 wt %. The gel was cooled to $-15°$ C., but the gel did not become hard to find that the gel was well suited for use as a coolant gel similar to that obtained in Example 6.

EXAMPLE 10

40 g of the gel obtained in Example 4 was immersed in 100 ml of an aqueous solution of ammonium chloride (Specific Gravity: 1.076 at 20° C., 27 wt %) for 8 hours. By ascertaining that the specific gravity of the liquid containing the gel reached 1.05 (at 20° C.), it was learned that the concentration of ammonium chloride in the aqueous phase contained in the gel reached 20 wt %. The gel did not become hard even when cooled to $-15°$ C., and the gel was well suited for use as a coolant gel similar to that obtained in Example 6.

COMPARATIVE EXAMPLE 7

A polyvinyl alcohol/borax gel commonly presented for practical use as a coolant gel was synthesized in accordance with the ordinary method. In detail, by referring to the literatures, for example, H. Thiele et al., Kolloid Z., 173, 63 (1960), H. Deuel and H. Neukon, Makromolekulare Chexie., 3, 13 (1949), and I. G. Farbenindustrie Akt., Fr. 743942 (1933), 10 g of a polyvinyl alcohol powder (Water Content: 7 wt %) having a degree of hydrolysis of 97.5 mol % and a viscosity average polymerization degree of 2000 was dissolved in 90 g of water to prepare 100 g of a 9.3 wt % aqueous solution, which was poured into 100 ml of an aqueous solution (2.5 wt %, 0.12M $Na_2B_4O_7$, pH 9.65) of borax anhydrate (sodium tetraborate) at 20° C. The pH value of the borax solution was changed to pH 9.45, and it was recognized that a large amount of a gel was separated instantaneously. About 60 ml of the water phase was separated to obtain a gel block, and the surface of the gel block was softly rinsed with a small quantity (50 ml) of water to obtain 142 g of a crumbly gel of putty form. The gel was white and translucent and readily to be deformed by picking by fingers. The gel was fluidal at some extent and could be filled in a container of desired shape to obtain a mass sealingly enclosed in the container.

The soft and weak gel was allowed to stand in an ice-chamber maintained at $-15°$ C. of a household refrigerator for 4 hours to freeze the gel in its entirety. The gel become hard and rigid similarly to ice.

On the other hand, 10 g of the soft and weak gel immersed in 10 g of ethylene glycol, but the gel was deformed after one hour immersion to become softer. After being immersed in 10 g of glycerin for half an hour, the gel was collapsed to become pasty. Similarly, the gel was immersed in 10 ml of methyl alcohol to find that the liquid phase become viscous and the gel was broken to a number of crumbly small pieces. It had already been pointed out by the prior references, for example, by I. Nickerson (J. Appl. Polym. Sci., 15, 111 (1971)) that the formation of a polyvinyl alcohol/borax system gel was hindered by the presence of the co-existing glycerin or the like materials.

The water content (determined by evaporating at 100° C. for 16 hours) of the soft and weak gel was 92 wt %.

As will be apparent from the foregoing, although polyvinyl alcohol/borax system gels are well-known as coolant gels and many investigations and researches have been made as applied for patent, for example, by Japanese Patent Publn. Nos. 21858/1968, 11210/1970, 36572/1970 and 19601/1971 and as reported, for example, by C. S Marvel (J. Am Chem. Soc., 60, 1045 (1938)), by S. Saito (Kolloid Z., 144, 41 (1955)) and by H. Ochiai (polymer (G.B.R.), 21, (5) 485 (1980)) other than the aforementioned I. G. F. (1933), it was found that the gels were crumbly, soft, weak and inferior in elasticity to have the pasty, putty-like, jelly-like or custered pudding-like appearance and have disadvantages that they are corroded by the alcohols which are useful as the freezing point depressing agents.

EXAMPLE 11

86 g of a commercially available polyvinyl alcohol powder (Water Content: 7 wt %) having a degree of hydrolysis of 97 mol %, a viscosity average polymerization degree of 1700 and a viscosity at 20° C. of a 4% aqueous solution thereof of 26 cP. was dissolved in 914 g of water to obtain an 8.0 wt % aqueous solution.

On the other hand, 104 g of a commercially available bentonite (Reagent grade powder, Water Content: 15 wt %) was dispersed in 1500 g of water to obtain a 5.5 wt %. aqueous suspension of bentonite.

35 g of the aforementioned aqueous solution of polyvinyl alcohol and 10 g of the aforementioned aqueous suspension of bentonite was mixed together to adjust the concentration of polyvinyl alcohol to 6.2 wt % and to adjust the concentration of bentonite to 1.3 wt %. In the meantime, the used bentonite was subjected to analytical tests including an X-ray diffractometry, differential thermal analysis, an identification using an electron microscope, a dehydration test by heating, a test to learn the interlayer expansion by glycerin, a cation exchange test 89 meq/100 g and an ultimate analysis. The result of the ultimate analysis revealed that the bentonite contained 66.7 wt % of $SiO_2$, 8.7 wt % of $Al_2O_3$, 3.1 wt % of $Fe_2O_3$, 0.3 wt % of CaO, 0.16 wt % of MgO, 3.2 wt % of $Na_2O$, 0.3 wt % of $K_2O$, 0.0 wt % of $TiO_2$, 0.0 wt of MnO, 0.0 wt % of $P_2O_5$ and 15 wt % of $H_2O$. From the results of the tests, the dried clay mineral composition thereof, in % by weight, included 64% of montmorillonite group minerals, 1% of illites, 3% of talc, 18% of pyrophyllite and 1% of vermiculite. Accordingly, the content of the tri-strata composite layer clay mineral contained in the aforementioned aqueous suspension was calculated to be 1.1 wt %, and the ratio of the used tri-strata composite layer clay mineral was amounted to 1/6 of the polyvinyl alcohol. 45 g of the thus obtained aqueous suspension was poured into a polyethylene beaker having a bottom of 8 cm in diameter, and cooled at −50° C. for 0.5 hours to be frozen and molded, followed by dehydration in vacuum for 4 hours. After thawing, 9.8 g of a rubber-like gel (Percentage Dehydration Rate: 78 wt %, Water Content: 65 wt %) was obtained. The gel was immersed in 10 ml of city water for 6 hours to absorb water until the weight thereof reached 15 g (Water Content: 77 wt %). The gel was applied with a loading of 4 kg/cm$^2$ to ascertain that no appreciable deformation and exudation of water observed (99% of contained water was retained).

After allowing the gel to stand in an ice chamber of a cooling box at −15° C. for 3 hours, the gel became hard to form a rigid ice-like mass. 10 g of the rigid ice-like mass was immersed in 10 ml of warm water of 40° C. As a result, the mass was gradually softened and recovered to the original state of rubber-like elastic gel. The water-containing gel thus obtained could be used for the substitution for ice as a coolant or cooling medium.

The used bentonite powder (2.0 g) was subjected to the test stipulated by Japan Pharmacopoeia to learn the swelling capacity. In detail, 100 ml of water was contained in a mess cylinder, to which the aforementioned 2 g of powder was added dividedly for 10 times. Each divided sample was added in such a way that it was added after almost all of the sample added previously was settled. After the completion of adding all of the sample bentonite, the mess cylinder was held stationarily for 24 hours. The result was that the volume of settled bentonite was far lower than the stipulated standard (higher than 20 ml), the settled volume being only 8 ml.

Similarly, in accordance with the test method stipulated by Japan Pharmacopoeia, the gel forming capacity of the bentonite powder was tested using 6 g of the sample. In detail, the powder was mixed with 0.30 g of magnesium oxide, and the mixture was added to 200 ml of water dividedly for several times. After shaking for one hour, 100 ml of the obtained suspension was picked up and allowed to stand for 24 hours. The transparent supernatant layer separated at the upper portion exceeded the standard (less than 2 ml) and amounted to 12 ml. As should be clear from the foregoing, the commercially available bentonite used in this Example did not satisfy the standard stipulated by Japan Pharmacopoeia. However, as has been described hereinbefore, such bentonite may be satisfactorily used in the present invention without any inconvenience.

EXAMPLE 12

In accordance with the general procedure as described in Example 11, 300 g of an 8 wt % aqueous solution of a polyvinyl alcohol and 130 g of an aqueous suspension of bentonite were prepared and then mixed together to obtain a mixture containing 5.6 wt % of polyvinyl alcohol and 1.7 wt % of bentonite. 430 g of the thus obtained aqueous suspension was poured into a pillow-shaped bag made of a polyethylene film, and the opening of the bag was sealingly closed using a metal fitting followed by cooling at −50° C. for 2 hours to be frozen and molded. Then, the polyethylene film was peeled off, and the thus bared content was subjected to dehydration in vacuum for 8 hours to obtain 204 g of freeze-dried body (Percentage Dehydration Rate: 53 wt %, Water Content: 85 wt %) was obtained. After allowing the body to stand at room temperature for 8 hours to thaw, it was immersed in 200 ml of city water for 6 hours. As the result of immersion, the weight of the molded body was increased to 220 g (Water Content: 86 wt %).

The resultant molded body was a swelling mass excellent in elasticity, and was not deformed with no appreciable exuded water even when it was squeezed by hands of an adult having ordinary power. The water-retention rate was 99%.

After storing the molded body while being contained in a transparent bag made of polyvinyl chloride for one month, the appearance and the touch felt by fingers (elasticity or resiliency and flesh-like feeling) were not changed.

In view of the fact mentioned above, it should be apparent that a large quantity, about 85 wt %, of water was contained in the originally molded gel, and the water content was firmly held internally of the gel. The gel was allowed to stand in an ice-chamber (maintained at −20° C.) of a refrigerator for 3 hours to become hard by freezing. The gel could be used as a cooling medium in place of ice.

EXAMPLE 13

85 g of a powder (Water Content: 6 wt %) of a commercially available polyvinyl alcohol having a degree of hydrolysis of 97 mol %, a viscosity average polymerization degree of 2200 and a viscosity at 20° C. of a 4% aqueous solution of 54 cP. was dissolved in 915 g of water to obtain an 8% aqueous solution.

106 of a commercially available bentonite (Reagent grade powder, Water Content: 17 wt %) was dispersed in 1490 g of water to obtain a 5.5% bentonite suspension.

100 g of the aforementioned aqueous solution of polyvinyl alcohol was mixed with 4 g of the aforementioned bentonite suspension to prepare an aqueous suspension containing 7.6 wt % of polyvinyl alcohol and 0.2 wt % of bentonite. On the other hand, the bentonite of powder form used in the Example was subjected to x-ray diffractiometry, differential thermal analysis, identification using an electron microscope, dehydration by heating, interlayer expansion by glycerin and cation exchange tests, (78 meq/100 g). From the results of the tests in view of the result of ultimate analysis showing that the bentonite contained 67.2 wt % of $SiO_2$., 6.8 wt % of $Al_2O_3$, 4.1 wt % of $Fe_2O_3$, 0.3 wt % of CaO, 1.6 wt % of MgO, 0.4 wt % of $TiO_2$, 0.1 wt % of MnO, 0.1 wt % of $P_2O_5$, 3.2 wt % of $Na_2O$ and 0.4 wt % of $K_2O$. It was estimated that the dried clay material composition included 58% of montmorillonite group minerals, 1% of illites, 1% of talc, 11% of pyrophyllite and 1% of vermiculite. Accordingly, the concentration of tri-strata composite clay mineral in the aqueous suspension was 0.14 wt % which corresponded to 1/54 of the concentration of polyvinyl alcohol. 104 g of the aqueous suspension was poured into a polyethylene beaker having a bottom of 8 cm in diameter, followed by cooling at −63° C. for 0.5 hours to be frozen and molded, and then subjected to dehydration in vacuum for 6 hours to obtain 22 g of a gel having a percentage dehydration rate of 79 wt % and a water content of 60 wt %. The gel was immersed in 20 ml of city water for 6 hours. As a result of immersion in water, the weight of the gel was increased to 25 g (Water Content: 70 wt %). No appreciable deformation or exudation of water was observed even when a loading of 3 kg/cm$^2$ was applied to the gel, and the result of this loading test revealed that the water-retention rate was 98%. The gel was then frozen in an ice-box maintained at $-15°$ C. to become an ice-like block The gel was subjected to repeated cycle of cooling at $-15°$ C. and softening at 40° C. for 50 times to ascertain that the gel retained the initial integrity so that it could be well suited for use as a coolant.

2 0 g of the commercially available bentonite powder used in this Example was tested in accordance with the test method stipulated in Japan Pharmacopoeia to reveal that the apparent volume of precipitant was 9 ml which was far below the standard (more than 20 ml). Similarly, the gel forming capacity thereof was tested in accordance with the test method stipulated in Japan Pharmacopoeia to obtain the result that the height of the supernatant transparent layer separated at the upper portion passed the standard (less than 2 ml) with slight allowance.

EXAMPLE 14

87 g of a powder (Water Content: 7 wt %) of a commercially available polyvinyl alcohol having a degree of hydrolysis of 97 mol %, a viscosity average polymerization degree of 1700 and a viscosity at 20° C. of a 4% aqueous solution thereof of 26 cP. was dissolved in 919 g of water to prepare an 8 wt % aqueous solution.

120 g of a commercially available vermiculite powder (Water Content: 9 wt %) was dispersed in 1200 g of water to prepare an 8 wt % aqueous suspension.

120 g of the aforementioned aqueous solution of polyvinyl alcohol was mixed with 40 g of vermiculite suspension to prepare a mixed suspension containing 6 wt % of polyvinyl alcohol and 2 wt % of vermiculite. On the other hand, from the results of tests, it was determined that the dried clay mineral composition (in wt %) contained 4% of montmorillonite group minerals, 2% of illites, 3% of talc, 2% of pyrophyllite, 85% of vermiculite. The composition contained 42% of $SiO_2$, 19% of $Al_2O_3$, 2% of $TiO_2$, 8% of $Fe_2O_3$, 2% of FeO, 1% of CaO, 22% of MgO, 1% of $K_2O$ and 1% of $Na_2O$. In view of the aforementioned test results, it was revealed that the concentration of the tri-strata composite layer clay minerals was 1.9 wt % which corresponded to $\frac{1}{3}$ of the concentration of the contained polyvinyl alcohol. 160 g of the aqueous suspension was poured into a polyethylene beaker having a bottom of 8 cm in diameter followed by cooling at $-80°$ C. for 0.5 hours to be frozen and molded, and 54 g of a gel having a percentage dehydration rate of 66 wt % and a water content of 76 wt % was obtained after being dehydrated in vacuum for 6 hours. By immersing the gel in 50 ml of city water for 6 hours, the weight of the gel was increased to 74 g (Water Content: 83 wt %). The gel was not deformed even when a loading of 53 g/mm$^2$ was applied to the gel, and the original shape of the gel is restored immediately after the loading is removed. The gel was frozen in an ice-chamber of a cooling box to be used as a substituent for ice.

EXAMPLE 15

An 8 wt % aqueous solution of polyvinyl alcohol was prepared generally in accordance with the procedures as described in Example 11.

30 g of the bentonite powder same as that used in Example 11 was dispersed in 560 g of an aqueous solution of sodium pyrophosphate containing 10.7 wt % of $Na_4P_2O_7.10H_2O$ to prepare a 4.5 wt % aqueous suspension 110 g of the aqueous solution of polyvinyl alcohol was mixed with 125 g of the aqueous suspension of bentonite to prepare a mixed suspension containing 3.7 wt % of polyvinyl alcohol and 2.3 wt % of bentonite. The concentration of the suspended tri-strata composite layer clay minerals was 2.0 wt %, i.e. $\frac{1}{2}$ times of the concentration of polyvinyl alcohol.

235 g of the mixed aqueous suspension was poured into a polyethylene beaker having a diameter of 8 cm, followed by cooling at $-63°$ C. for 0.5 hours, and 75 g of a gel having percentage dehydration rate of 68 wt % and a water content of 81 wt % was obtained after thawing. The gel was not deformed even when a loading of 4 kg/cm$^2$ was applied thereto with no appreciable exudation of water. The gel was frozen at $-15°$ C. to become hard and could be used as a substituent for ice.

EXAMPLE 16

15 g of the aqueous solution of polyvinyl alcohol which was the same as used in Example 11 was mixed with 100 g of the aqueous suspension of bentonite which was the same as used in Example 7 to prepare a mixed aqueous suspension containing 1 wt % of polyvinyl alcohol and 4 wt % of bentonite. The concentration of the tri-strata composite layer clay minerals in the mixed aqueous suspension was 3.4 wt %, i.e. $\frac{1}{3}$ times of the concentration of polyvinyl alcohol.

115 g of the suspension was poured into a cylinder having a bottom of 2 cm in diameter, followed by cooling at $-74°$ C. for 0.5 hours to be frozen and molded, and then subjected to dehydration in vacuum for 6 hours to obtain 27 g of a gel having a percentage dehydration rate of 76 wt % and a water content of 79 wt % after thawing.

No appreciable deformation or exudation of water was observed even when a loading of 1 kg/cm$^2$ applied to the gel. The gel was frozen at $-20°$ C. to become hard and suited to be used as a sustituent for ice.

EXAMPLE 17

87 g of a powder (Water Content: 7 wt %) of a commercially available polyvinyl alcohol having a degree of hydrolysis of 97 mol %, a viscosity average polymerization degree of 1700 and a viscosity at 20° C. of a 4% aqueous solution thereof of 26 cP. was dissolved in 920 g of water to prepare an 8 wt % aqueous solution.

120 g of a commercially available talc (Water Content: 14 wt %) was dispersed in 1190 g of water to prepare an 8 wt % aqueous suspension.

265 g of the aforementioned aqueous solution of polyvinyl alcohol was mixed with 250 g of the aforementioned aqueous suspension of talc to prepare a mixed suspension containing 4 wt % of polyvinyl alcohol and 3.8 wt % of talc.

On the other hand, the used talc was subjected to analytical tests to reveal that the dried clay mineral composition, in % by weight, contained 6% of montmorillonite group minerals, 2% of illites, 87% of talc, 2% of pyrophillite and 1% of vermiculite. The composition contained 32% of MgO, 64% of $SiO_2$, 1% of $Al_2O_3$, 0.3% of CaO, 0.3% of $K_2O$, 0.7% of $Na_2O$ and 0.5% of $Fe_2O_3$. Accordingly, the concentration of the tri-strata composite layer clay minerals contained in the aforementioned mixed aqueous suspension was 3.7 wt %, which was substantially the same as that of polyvinyl alcohol.

515 g of the mixed aqueous suspension was poured into two cylindrical casting molds, each having a diameter of 8 cm and a height of 4 cm, followed by cooling at −76° C. for 1.5 hours to be frozen. Then, the molded masses were discharged from the casting molds, followed by dehydration in vacuum for 6 hours, and then the masses were allowed to thaw, whereby two cylindrical masses were obtained. The percentage dehydration rate was 72 wt %, and the water content was 70 wt %. No appreciable deformation or exudation of water was observed even when a loading of 3 kg/cm$^2$ was applied on each of the cylindrical masses such that the loading was applied in the longitudinal direction, in other words in the direction of height. The water-retention rate at this loading test was 98%.

The gel was packed in a bag made of polyvinyl chloride followed by cooling at −15° C. to obtain a solidified mass which could be used as an excellent coolant.

EXAMPLE 18

10 g of the gel prepared in Example 11 was immersed in 8 g of ethylene glycol for 16 hours. The initial index of refraction $n_D^{20}$ (1.430) of the liquid containing the gel was lowered to a constant value of 1.385. As a result of immersion, the concentration of ethylene glycol in the water phase contained in the gel reached 50 wt %. No hardening or freezing phenomenon was observed even by cooling the gel to −29° C., and the gel retained the initial rubber-like elasticity. After subjecting the gel 33 times cyclic operations of cooling the same to −25° C. and then heating again to 40° C., the touch of the gel was not changed to have the initial living tissue like elasticity and satisfactory strength, so that it could be satisfactorily used as a coolant.

EXAMPLE 19

140 g of the gel (Water Content: 86wt %) which was the same as that used in Example 12 was immersed in 68 g of glycerin. As a result of immersion, the initial specific gravity (1.27 at 20° C.) of the liquid containing the gel was lowered to 1.10 at 20° C. and the initial viscosity (1500 cP. at 20° C.) was also lowered to 4 cP., to learn that the concentration of glycerin in the aqueous phase contained in the gel reached 40 wt %. The gel was not hardened even by cooling to −15° C. to retain the initial fresh looking and touch, so that it could be satisfactorily used as a coolant.

EXAMPLE 20

20 g of the gel (Water Content: 70 wt %) prepared in Example 13 was immersed in 7 g of propylene glycol for 8 hours. As the index of refraction ($n_D^{25}$) of the liquid containing the gel reached a constant value of 1.3660, the aqueous solution contained in the gel reached the state containing 30% of propylene glycol. The specific heat at −1° C. was 0.92 cal/g.deg, and the specific heat at −15° C. was 1.92 cal/g.deg. The gel was not frozen or hardened even when cooled at −15° C., and retained its inherent rubber-like properties resembling a living tissue.

EXAMPLE 21

40 g of the gel (Water Content: 83 wt %) prepared in Example 14 was immersed in 50 ml of a 30 wt % aqueous solution of calcium chloride having a specific gravity at 20° C. of 1.29 for 8 hours. After the 8 hour immersion, the specific gravity of the aqueous solution containing the gel reached a constant value of 1.18 at 20° C. At that time, the concentration of calcium chloride in the aqueous solution contained in the gel reached 20 wt %. The gel was not hardened even by cooling the same to −15° C. to retain its flexibility, and hence the gel could be used as a soft coolant.

EXAMPLE 22

40 g of the gel as prepared in Example 14 was immersed in 100 ml of a 27 wt % aqueous solution (Specific gravity: 1.076 at 20° C.) of ammonium chloride for 8 hours. By ascertaining that the specific gravity of the liquid containing the gel reached a constant value of 1.05 at 20° C., it was recognized that the concentration of ammonium chloride in the aqueous solution contained in the gel reached 20 wt %. The gel was not hardened even by cooling the same to −15° C., and thus could be used satisfactorily as a soft coolant.

EXAMPLE 23

500 g of a 9.4% aqueous solution of a polyvinyl alcohol having a degree of hydrolysis of 99.5 mol %, a viscosity average polymerization degree of 2600 and a viscosity of a 4% aqueous solution thereof at 20° C. of 67 cP. was mixed with 500 g of ethylene glycol. The mixture was poured into a polyethylene container having a bottom of 21 cm×25 cm, followed by cooling at −50° C. for 8 hours, and then directly subjected to dehydration in vacuum to remove 40 g of water. The percentage dehydration rate, i.e. the weight reduction rate of the cooled mass, was 4 wt %. The resultant gel had elasticity and flexibility resembling KONNYAKU, and yet had a mechanical strength superior to that of KONNYAKU and a compressive strength of more than 10 kg/cm$^2$.

The gel was not hardened or solidified after being allowed to stand in an ice-making chamber of a household refrigerator, and also withstood cylic cooling and subsequent heating to room temperature to find that it was excellent when used as a soft coolant.

EXAMPLE 24

630 g of a polyvinyl alcohol (Water Content: 7 wt %) having a degree of hydrolysis of 97.5 mol %, a viscosity average polymerization degree of 2200 and a viscosity of a 4% aqueous solution thereof at 20° C. of 56 cP. was dissolved in 4800 g of water to prepare an 11.4 wt % aqueous solution.

4536 g of the thus prepared aqueous solution was mixed with 2443 g of polypropylene glycol, and 4536 g of the mixture was poured into a polyethylene container having a bottom of 90 cm×90 cm and a depth of 1 cm, followed by allowing to stand at −50° C. for 6 hours, and then directly subjected to dehydration in vacuum to reach the percentage dehydration rate to 15 wt %, the weight of the removed water to 680 g and the liquid content to 91 wt %.

In order to make a vest for an adult man from the thus obtained gel of 5 mm thick sheet form, one for each of the left front-body, rear-body and right front-body was cut from the gel sheet so that three cut-pieces for a vest having a length of 48 cm and a chest (including slack) of 97 cm were cut off. Then, said three cut-pieces were sewn together by sewing the left and right shoulder portions.

The thus made cooling vest was placed in a large-scale cooling box for industrial use maintained at −20° C. for 8 hours. No hardening or solidification was observed so that the cooled vest could be fitted over the working clothes by an adult man who could comfortably be working at a high temperature working site.

EXAMPLE 25

30 g of a polyvinyl alcohol powder having a degree of hydrolysis of 99.5 mol %, a viscosity average polymerization degree of 2600 and a viscosity of a 4% aqueous solution thereof at 20° C. of 66 cP., 158 g of propylene glycol and 292 g of water were mixed together to prepare a mixture which was agitated at 90° C. for 2 hours. Then, 471 g of the mixture was poured into a polyethylene container having a diameter of 20 cm and a depth of 2 cm, followed by cooling at −45° C. for 5 hours, and then subjected to dehydration in vacuum to reach the percentage dehydration rate of 13 wt % (Weight of Removed Water: 61 g, Liquid Content: 93 wt %).

The thus molded disk-shaped gel (Diameter: 19.5 cm Thickness: 1.4 cm) was cut along a radial line, i.e. along a line from the center of the disk to a selected point on the circumference. Desired segmental areas of the disk were overlapped to form a cone made of a gel sheet and having no bottom. The thus obtained cone-shaped cap was not hardened even after being allowed to stand for one night in a household refrigerator, and could be conveniently used as a cap-shaped coolant only by wrapping with gauze and applied on a breast of a patient suffering mammary phlegmasia in maternity or other hospitals.

EXAMPLE 26

From two sheets of disk-shaped gel prepared in accordance with the method as described in Example 25, four sectors or segmental pieces each subtending a center angle of 50 degrees and eight rectangular plates of 7 cm×5 cm were cut out. These pieces were arranged on the external faces of the left and right cups of a brassiere (Size: 95D) sold under the Registered Trade Mark "Lovable R", and sewn to the cups using a polyester string (0.1 mm in diameter). The brassiere attached with the cut gel pieces were placed in household refrigerator for 6 hours, and it was ascertained that the gel-pieces were not hardened to be held as the coolant gels having fresh appearance and soft touch. The brassiere was tried to be used as a substituent for the triangle bandage conventionally used in maternity or other hospitals for cooling expanded breasts due to inflammation, and favorable result could be obtained thereby.

EXAMPLE 27

500 g of a 9.4 wt % aqueous solution of polyvinyl alcohol prepared by dissolving 50.5 g of a powder (Water Content: 7 wt %) of a commercially available polyvinyl alcohol having a degree of hydrolysis of 99.5 mol %, a viscosity average polymerization degree of 2600 and a viscosity of a 4% aqueous solution thereof at 20° C. of 67 cP. in 450 g of water was mixed with 500 g of ethylene glycol to obtain a mixture. The mixture was poured into a polyethylene container having a bottom of 21 cm×15 cm, followed by cooling at −50° C. for 6 hours, and then directly subjected to dehydration in vacuum to remove 48 g of water (Percentage Dehydration Rate: 5 wt %). The thus obtained gel had an elasticity and flexibility resembling those of KONNYAKU, and yet was superior in mechanical strength. The compressive strength of the gel was 10 kg/cm$^2$. The gel having the dimensions of 20 cm×15 cm×3 cm was used as the first gel layer (A).

On the other hand, 1500 g of a 9.4 wt % aqueous solution of polyvinyl alcohol prepared as described above was poured into a polyethylene container having the same shape and dimensions as set forth above, followed by cooling at −50° C. for 6 hours, and then subjected directly to dehydration in vacuum for 6 hours. After thawing, 1200 g (Water Content: 88 wt %, Percentage Dehydration Rate: 20 wt %) of rubber-like gel was obtained. The gel was immersed in 1 liter of city water for 6 hours, whereupon the gel absorbed water and the weight thereof was increased to 1370 g (Water Content: 90 wt %). The gel was not deformed with no appreciable exudation of water therefrom even when it was applied with a loading of 10 kg/cm$^2$. The gel was changed to ice-like form by placing for 8 hours the gel absorbing water in an ice-chamber of a cooling box, the ice-chamber being maintained at −15° C. The gel was immersed in 1 liter of warm water of 40° C., whereupon the gel was restored to its original resilient gel resembling a rubber. The gel having the dimensions of 20 cm×15 cm×4.6 cm was used as the second gel layer (B).

The gel layer (A) was overlaid on the gel layer (B), and the composite layers were wrapped with a polyethylene bag and allowed to stand an ice-making chamber of a household refrigerator for one night, whereby the gel layer (B) was frozen to become hard and the gel layer (A) exhibited cold KONNYAKU-like appearance and retained its inherent flexibility and resiliency.

The thus produced composite coolant gel could withstand repeated cooling and heating operation so that it was well suited for use as a substituent for an ice-pillow.

EXAMPLE 28

30 g of a powder of a polyvinyl alcohol having a degree of hydrolysis of 99.5 mol %, a viscosity average polymerization degree of 2600 and a viscosity of a 4% aqueous solution thereof at 20° C. of 66 cP., 158 g of propylene glycol and 292 g of water were mixed together and then agitated at 93° C. for 2 hours to prepare a mixture. 470 g of the mixture was poured into a polyethylene container having a diameter of 20 cm and a depth of 2 cm, followed by cooling at −50° C. for 6 hours, and then subjected directly to dehydration in vacuum to reach the percentage dehydration rate to 13 wt % (Weight of Removed Water: 60 g, Liquid Content: 93 wt %).

The thus molded disk-like gel (Diameter; 19.5 cm, Thickness: 1.4 cm) was cut along a radial line, i.e. along a line from the center of the disk to a selected point on the circumference. Then, desired segmental areas of the disk were overlapped to form a cone made of the gel layer (A) and having no bottom.

On the other hand, 500 g of the aforementioned 10 wt % aqueous solution of polyvinyl alcohol was poured into a polyethylene container having a diameter of 20 cm and a depth of 2 cm, followed by allowing to stand at −47° C. for 6 hours, and then subjected directly to dehydration in vacuum to reach the percentage dehydration rate to 17 wt % (Weight of Removed Water: 85 g, Water Content: 88.0 wt %).

The gel was immersed in 1 liter of city water for 6 hours, whereupon the gel absorbed water and the weight thereof was increased to 430 g (water Content: 88.4 wt %).

The thus molded disk-like gel (Diameter: 19.5 cm, Thickness: 1.5 cm) was cut along a radial line, i.e. along a line from the center of the disk to a selected point on the circumference. Then, desired segmental areas of the disk were overlapped to form a cone made of the gel layer (B) and having no bottom.

These two conical gel layers were overlaid such that the gel layer (A) was placed internally of the gel layer (B), followed by sewing to unite them. The thus united cap-shaped combination was allowed to stand in an ice-making chamber of a household refrigerator for one night, whereby the inside gel layer (A) did not become hard although the gel layer (B) was frozen to become hard. The conical united gel layers (A) and (B) was conveniently used as a cap-shaped coolant by wrapping with gauze and applied on a breast of a patient suffering mamary phlegmasia, since the side contacting with the skin of the patient was continuously held to have a soft touch.

EXAMPLE 29

Two sheets for each of the disk-shaped gels of different systems (one being a polyvinyl alcohol/propylene glycol/water system and the other being a polyvinyl alcohol/water system) obtained as described in Example 28 were prepared.

Four sectors or segmental pieces each subtending a center angle of 50 degrees and eight rectangular plates of 7 cm×5 cm were cut out from the two sheets of the polyvinyl alcohol/water system gel. These cut-pieces were arranged on the external faces of the left and right cups of a brassiere (Size: C70, Bust: 85, Underbust: 70) produced and sold by Wacoal Co., Ltd. and sewn to the cups.

Similarly, four sectors or segmental pieces each subtending a center angle of 50 degrees and eight rectangular plates of 7 cm×5 cm were cut out from the two sheets of the polyvinyl alcohol/polypropylene glycol/water system gel. These cut-pieces were arranged on the internal sides of the cups, and sewed thereto. A rubber ball having a diameter of 10 cm was contained in each of the cups of the brassiere. Then, the brassiere was allowed to stand in a household refrigerator for 6 hours. Although the gel-pieces on the external faces of the cups were hardened, the gel-pieces fitted inside of the cups were left unhardened to retain a soft touch due to inherent flexibility and resiliency. After removing two rubber balls from the respective cups, and then the brassiere provided with the gels prepared in accordance with the present invention was subjected trial use for cooling expanded breasts due to inflammation in place of the conventionally used triangle bandage. The result of trial uses in maternity or other hospitals were satisfactory.

EXAMPLE 30

1 kg of a 10.0 wt % aqueous solution of a polyvinyl alcohol having a degree of hydrolysis of 99.5 mol %, a viscosity average polymerization degree of 2600 and a viscosity of a 4% aqueous solution thereof at 20° C. of 67 cP. and 500 g of ethylene glycol were mixed to prepare an aqueous solution containing 6.7 wt % of polyvinyl alcohol and 33 wt % of ethylene glycol. The thus prepared aqueous solution was cast into a helmet molding mold, followed by cooling at −40° C. for 8 hours, and then subjected to dehydration in vacuum directly to remove 200 g of water (Percentage dehydration rate 13 wt %). Then the dehydrated mass was allowed to stand at room temperature for thawing.

The thus molded gel of helmet shape was allowed to stand in an ice-making chamber maintained at −10° C. of a refrigerator for 8 hours. The inherent flexibility of the gel was not impaired, and the helmet thus produced could be conveniently used as a cooling cap in the medical therapy for alleviating the harmful secondary action caused by chemotherapy for curing cancer diseases.

EXAMPLE 31

Generally in accordance with the procedures as in Example 30, except in that 440 g of propylene glycol and 60 g of λ-carrageenan were used in place of 500 g of propylene glycol, a molded gel of helmet shape was prepared. The color of the helmet-shaped gel was light brown and different from the white color of the gel prepared by the preceding Example 30. However, the gel prepared by this Example was excellent in resiliency and elasticity and had a sufficient mechanical strength for use as a helmet which might be subjected to frequent put-on and put-off operations. The helmet-shaped gel was allowed to stand for one night in an ice box of a refrigerator maintained at −20° C. to reveal that it was not frozen or hardened to retain its initial elasticity and resiliency. The helmet-shaped gel is allowed to stand at ambient temperature until the temperature thereof reached 0° C., whereupon it was put on the head of an adult, who lay in the horizontal supine position. After the lapse of 8 minutes, the temperature of the head skin reached 20°∼22° C., and the temperature of the head skin was maintained within 20° C. to 25° C. for 33 minutes. The helmet-shaped gel was composed of 7.5 wt % of polyvinyl alcohol, 33.4 wt % of propylene glycol, 4.6 wt % of λ-carrageenan and 54 wt % of water.

Although the present invention has been described with reference to specific examples thereof, it should be understood that various modifications and variations may be easily made by those skilled in the art without departing from the spirit of the invention. It is, thus, intended to include all such modifications and variations within the wide scope of the invention as defined in the appended claims.

What is claimed is:

1. A process for the preparation of a gel insoluble in water for use as a cooling medium, comprising only the steps of preparing an aqueous solution or suspension containing a polyvinyl alcohol having a degree of hydrolysis of not less than 95 mol % and a viscosity average polymerization degree of not less than 1500, casting said solution or suspension into a mold having desired shape and dimensions, cooling the cast aqueous solution to a temperature of not higher than − (minus) 6° C., and then dehydrating without thawing the cooled mass of the cast aqueous solution in vacuum until the percentage dehydration rate reaches not less than 5 wt % to obtain a gel insoluble in water having a water content of 60 to 95 wt %, based on the weight of the swelled mass.

2. The process for the preparation of a gel insoluble in water for use as a cooling medium as claimed in claim 1, wherein said aqueous suspension contains said polyvinyl alcohol and a laminate structure clay mineral including a fundamental module of a tri-strata (2:1 type) composite layer, and wherein the amount of the added clay mineral is from a small but effective amount up to not more than five times as much as the weight of said polyvinyl alcohol.

3. The process for the preparation of a gel insoluble in water for use as a cooling medium as claimed in claim 1, further comprising the step of immersing said mass, after being dehydrated in vacuum, into water until the water content of said mass reaches 60 to 95 wt % based on the weight of the swelled mass.

4. The process for the preparation of a gel for use as a cooling medium as claimed in claim 1, further comprising the step of allowing said mass, after being dehydrated in vacuum, to contact with a small but effective amount of the one selected from the group consisting of a water-soluble inorganic salt selected from the group consisting of magnesium chloride, calcium chloride, sodium chloride, ammonium chloride, magnesium nitrate and zinc nitrate, a water-soluble organic compound selected from the group consisting of water-soluble polyhydric alcohols, water-soluble monohydric alcohols, and derivatives of said polyhydric or monohydric alcohols, and aqueous solution thereof.

5. The process for the preparation of a gel for use as a cooling medium as claimed in claim 1, further comprising the steps of immersing said mass, after being dehydrated in vacuum, into water until the water content of said mass reaches 60 to 95% based on the weight of the swelled mass, and thereafter allowing the swelled mass to contact with a small but effective amount of the one selected from the group consisting of a water-soluble inorganic salt selected from the group consisting of magnesium chloride, calcium chloride, sodium chloride, ammonium chloride, magnesium nitrate and zinc nitrate, a water-soluble organic compound selected from the group consisting of water-soluble polyhydric alcohols, water-soluble monohydric alcohols, and derivatives of said polyhydric or monohydric alcohols, and aqueous solutions thereof.

6. The process for the preparation of a gel for use as a cooling medium as claimed in claim 1, wherein said aqueous solution or suspension contains said polyvinyl alcohol and a small but effective amount of an additional water-soluble organic compound, and wherein the concentration of said polyvinyl alcohol in the resultant aqueous solution or suspension ranges from 2.5 to 10 wt %.

7. The process for the preparation of a gel for use as a cooling medium as claimed in claim 1, wherein said aqueous suspension contains said polyvinyl alcohol, a small but effective amount of a laminate structure clay mineral including a fundamental module of tri-strata (2:1 type) composite layer, and a small but effective amount of a water-soluble organic compound, the amount of said clay mineral added being from a small but effective amount up to not more than five times as much as the weight of said polyvinyl alcohol, and wherein the concentration of said polyvinyl alcohol in the resultant aqueous suspension ranges from 2.5 to 10 wt %.

8. The process for the preparation of a gel for use as a cooling medium as claimed in claim 6, wherein said resultant aqueous solution or suspension is cast into a mold having desired shape and dimensions, followed by cooling without thawing to a temperature of not higher than − (minus) 6° C. and then dehydrating the cooled mass in vacuum until the percentage dehydration rate reaches within the range of from 5 wt % to 60 wt %.

9. The process for the preparation of a gel for use as a cooling medium as claimed in claim 2, wherein the main component of said clay mineral includes at least one selected from the group consisting of montmorillonite, vermiculite, illite, pyrophyllite and talc.

10. The process for the preparation of a gel for use as a cooling medium as claimed in claim 6, wherein said water-soluble organic compound is the one selected from the group consisting of water-soluble polyhydric alcohols, water-soluble monohydric alcohols, and derivatives of said polyhydric or monohydric alcohols.

11. The process for the preparation of a gel insoluble in water for use as a cooling medium as claimed in claim 10, wherein said polyhydric alcohol is the one selected from the group consisting of ethylene glycol, propylene glycol and glycerin.

12. A process for the preparation of a gel insoluble in water for use as a cooling medium and having a composite layer structure including a first gel layer A and a second gel layer B of higher water content: wherein said first gel layer A is prepared by only the steps of preparing an aqueous solution or suspension containing a polyvinyl alcohol having a degree of hydrolysis of not less than 95 mol % and a viscosity average polymerization degree of not less than 1500 and further containing an additional water-soluble organic compound, casting said solution or suspension into a mold having desired shape and dimensions, the concentration of said polyvinyl alcohol in said aqueous solution or suspension being within the range of from 2.5 to 10 wt % and the concentration of said additional water-soluble organic compound in said aqueous solution or suspension being within the range of from 20 to 80 wt %, cooling the cast aqueous solution or suspension to a temperature of not higher than − (minus) 6° C., and then dehydrating without thawing the cooled mass of the cast aqueous solution or suspension in vacuum until the percentage dehydration rate reaches not less than 5 wt %, to obtain a gel insoluble in water and having a water content of 60 to 95 wt %, based on the weight of the swelled mass; and wherein said second gel layer B is prepared by only the steps of preparing an aqueous solution of a polyvinyl alcohol having a degree of hydrolysis of not less than 95 mol % and a viscosity average polymerization degree of not less than 1500, casting said solution into a mold having desired shape and dimensions, cooling the cast aqueous solution to a temperature of not higher than − (minus) 6° C. to freeze the same to form a mass of desired shape and dimensions, and thereafter dehydrating without thawing the frozen mass of the cast aqueous solution in a vacuum until the percentage dehydration rate reaches not less than 5 wt %, to obtain a gel insoluble in water and having a water content of 60 to 95 wt %, based on the weight of the swelled mass.

13. The process for the preparation of a gel insoluble in water for use as a cooling medium as claimed in claim 6, wherein a polyhydric alcohol is used as said water-soluble organic compound in combination with a small but effective amount of a highly viscous water-soluble high polymer having a viscosity of a 2 wt % aqueous solution thereof of not less than 300 cP. at 25° C.

14. The process for the preparation of a gel insoluble in water for use as a cooling medium as claimed in claim 13, wherein said highly viscous water-soluble high polymer is selected from the group consisting of pullulan, xanthane gum, trageacanth gum, carboxymethyl cellulose, polyacrylic acid, i-carrageenan, λ-carrageenan, κ-carrageenan, propylene glycol alginate and mixtures thereof.

15. The process for the preparation of a gel for use as a cooling medium as claimed in claim 13, wherein the content of said highly viscous water-soluble high polymer ranges not more than 50 wt % based on the weight of said polyhydric alcohol.

16. The process for the preparation of a gel for use as a cooling medium as claimed in claim 6, wherein the concentration of said organic compound in said resultant aqueous solution or suspension ranges from 20 to 80 wt %.

17. The process for the preparation of a gel insoluble in water for use as a cooling medium as claimed in claim 1, wherein said aqueous solution or suspension contains inorganic or organic materials which do not participate in the gel forming reaction of said polyvinyl alcohol and wherein the amount of said inorganic or organic materials added is less than ½ as much as the quantity of said polyvinyl alcohol.

* * * * *